(12) United States Patent
Nagasaka et al.

(10) Patent No.: US 12,420,832 B2
(45) Date of Patent: Sep. 23, 2025

(54) DRIVING ASSISTANCE DEVICE

(71) Applicant: AISIN CORPORATION, Aichi (JP)

(72) Inventors: Hidenori Nagasaka, Kariya (JP); Mitsuhiro Nimura, Kariya (JP); Keita Ogawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 62 days.

(21) Appl. No.: 18/269,346

(22) PCT Filed: Nov. 2, 2021

(86) PCT No.: PCT/JP2021/040387
§ 371 (c)(1),
(2) Date: Jun. 23, 2023

(87) PCT Pub. No.: WO2022/180937
PCT Pub. Date: Sep. 1, 2022

(65) Prior Publication Data
US 2024/0067214 A1    Feb. 29, 2024

(30) Foreign Application Priority Data
Feb. 26, 2021 (JP) .............................. 2021-029884

(51) Int. Cl.
*B60W 30/18* (2012.01)
*B60W 40/04* (2006.01)
(Continued)

(52) U.S. Cl.
CPC .. *B60W 60/0011* (2020.02); *B60W 30/18163* (2013.01); *B60W 40/04* (2013.01);
(Continued)

(58) Field of Classification Search
CPC ....... B60W 60/0011; B60W 30/18163; B60W 40/04; B60W 40/06; B60W 2552/53;
(Continued)

(56) References Cited

U.S. PATENT DOCUMENTS

2015/0345967 A1* 12/2015 Meuleau ............ G01C 21/3453
701/25
2017/0122754 A1   5/2017 Konishi et al.
2022/0223038 A1*  7/2022 Chikamori ....... G08G 1/096775

FOREIGN PATENT DOCUMENTS

JP    2006105686 A  *  4/2006
JP    2017-83446 A     5/2017
(Continued)

OTHER PUBLICATIONS

Huawei Technologies, Ltd., Feb. 14, 2019 English Machine Translation_ JP2019504301 A provided by Patent Translate by EPO and Google (Year: 2019).*

(Continued)

*Primary Examiner* — Ashley L Redhead, Jr.
(74) *Attorney, Agent, or Firm* — Sughrue Mion, PLLC

(57) ABSTRACT

There is provided a driving assistance device in which when driving assistance for a vehicle is provided, a travel path of the vehicle that takes into account traffic congestion conditions for each lane can be generated and driving assistance based on the travel path can be appropriately provided. Specifically, a planned travel route on which the vehicle travels is obtained, traffic congestion conditions for each lane on the planned travel route are obtained, a travel path recommended for the vehicle to travel along on a road included in the planned travel route is generated using map information including at least information about markings and the traffic congestion conditions for each lane, and driving assistance for the vehicle is provided based on the generated travel path.

4 Claims, 22 Drawing Sheets

(51) Int. Cl.
*B60W 40/06* (2012.01)
*B60W 60/00* (2020.01)

(52) U.S. Cl.
CPC ......... *B60W 40/06* (2013.01); *B60W 2552/53* (2020.02); *B60W 2554/406* (2020.02); *B60W 2556/40* (2020.02); *B60W 2556/50* (2020.02)

(58) Field of Classification Search
CPC ....... B60W 2554/406; B60W 2556/40; B60W 2556/50; G01C 21/3492; G01C 21/3658; G01C 21/3691; G08G 1/167; G16Y 10/40; G16Y 40/60
See application file for complete search history.

(56) References Cited

FOREIGN PATENT DOCUMENTS

| JP | 2017083446 A | * | 5/2017 | ............ B60W 10/04 |
| JP | 2019504301 A | * | 2/2019 | |

OTHER PUBLICATIONS

Konishi Hitosh, May 18, 2017 English Machine Translation_ JP2017083446 A provided by Patent Translate by EPO and Google ( Year: 2017).*
Ata Teruaki, Oct. 1, 2004 English Machine Translation_ JP2006105686 A provided by Patent Translate by EPO and Google (Year : 2004).*
International Search Report for PCT/JP2021/040387 dated Jan. 18, 2022.

\* cited by examiner

FIG. 3

Traffic congestion conditions for each lane (traffic congestion information)

| Statistics date and time | Section starting point | Section end point | Lane No. | Traffic congestion conditions |
|---|---|---|---|---|
| 7/2 9:05 | 100001-20 | 100004-40 | 1 | Congested |
| 7/2 9:05 | 100013-30 | 100020-80 | 1 | Congested |
| 7/2 9:05 | 100013-30 | 100020-80 | 2 | Congested |
| ... | ... | ... | ... | ... |

Sections other than the above-described sections are "free flow" or "unknown"

DRIVING ASSISTANCE DEVICE

CROSS REFERENCE TO RELATED APPLICATION

This application is a National Stage of International Application No. PCT/JP2021/040387 filed Nov. 2, 2021, claiming priority based on Japanese Patent Application No. 2021-029884 filed Feb. 26, 2021, the entire contents of which are incorporated in their entirety.

TECHNICAL FIELD

The present disclosure relates to a driving assistance device that provides driving assistance for a vehicle.

BACKGROUND ART

In recent years, as a vehicle's travel mode, an autonomous driving assistance system has been newly proposed that aids a user in driving a vehicle by performing some or all of user's driving operations by a vehicle side, in addition to manual travel in which the vehicle travels based on user's driving operations. In the autonomous driving assistance system, for example, a current location of the vehicle, a lane in which the vehicle travels, and the locations of other vehicles around the vehicle are detected whenever necessary, and vehicle control of steering, a drive source, a brake, etc., is autonomously performed so that the vehicle travels along a preset route.

In addition, when travel by autonomous driving assistance is performed, a travel path that is recommended for traveling is generated in advance for roads on which the vehicle travels, based on a planned travel route of the vehicle, map information, etc., and control is performed to allow the vehicle to travel along the generated travel path. For example, JP 2017-83446 A proposes a technique in which based on a future travel route of a vehicle and high-precision map information, there is created an action plan such as a deceleration event for decelerating the vehicle, an acceleration event for accelerating the vehicle, a stop event for stopping the vehicle, a lane change event for making a lane change, a passing event for allowing the vehicle to pass a lead vehicle, and a lane keep event for keeping the vehicle in a lane in which the vehicle travels so that the vehicle does not drift out of the lane, and the vehicle is controlled in accordance with the created action plan, by which autonomous driving is performed.

CITATIONS LIST

Patent Literature

Patent Literature 1: JP 2017-83446 A (paragraphs 0051-0053)

SUMMARY OF THE DISCLOSURE

Technical Problems

Here, a road on which the vehicle travels is not always one on which the vehicle can travel by freely selecting a travel path within the road, and particularly, when traffic congestion has occurred in a given lane, a situation in which movement into the congested lane is restricted occurs. For example, as shown in FIG. 22, when there is a facility 102 which is a destination of a vehicle 101, and the far left lane is congested with vehicles that are waiting to enter the facility 102, if the vehicle 101 attempts to move into the far left lane before reaching the facility 102, then there is a possibility that the vehicle 101 may hinder travel of other vehicles traveling around the vehicle 101. Thus, an action plan that identifies beforehand a lane change location needs to be created taking into account traffic congestion conditions for each lane.

The present disclosure is made to solve the above-described conventional problem, and provides a driving assistance device in which when driving assistance for a vehicle is provided, a travel path of the vehicle can be generated that identifies a lane change location at which a lane change is made to a recommended lane that is recommended for traveling, taking into account traffic congestion conditions for each lane obtained from an external source, and driving assistance based on the travel path can be appropriately provided.

Solutions to Problems

To provide the above-described driving assistance device, a driving assistance device according to the present disclosure includes: planned travel route obtaining means for obtaining a planned travel route on which a vehicle travels; traffic congestion conditions obtaining means for obtaining, from an external source, traffic congestion conditions for each lane on the planned travel route; travel path generating means for generating a travel path, targeting a section from a current location of a vehicle to a location a predetermined distance ahead of a vehicle and using map information including at least information about markings and the traffic congestion conditions for each lane, the travel path identifying a lane change location at which a lane change is made to a recommended lane, and the recommended lane being recommended for a vehicle to travel in on a road included in the planned travel route; and driving assistance means for providing driving assistance for a vehicle, based on a travel path generated by the travel path generating means.

Note that the term "driving assistance" refers to a function of performing or aiding in at least one of driver's vehicle operations instead of a driver, or to provision of display guidance or voice guidance for assisting in driving.

In addition, the "information about markings" may be information that identifies the types or layout of markings themselves that mark off lanes, or may be information that identifies whether a lane change can be made between adjacent lanes, or may be information that directly or indirectly identifies the configurations of lanes.

In addition, the expression "obtain, from an external source, traffic congestion conditions" refers to obtaining of traffic congestion information generated by an entity (e.g., a server) other than the vehicle from the entity, for example, through communication.

Advantageous Effects of Various Aspects of the Disclosure

According to the driving assistance device according to the present disclosure that has the above-described configuration, when driving assistance for a vehicle is provided, a travel path of the vehicle can be generated that identifies a lane change location at which a lane change is made to a recommended lane that is recommended for traveling, taking into account traffic congestion conditions for each lane obtained from an external source. As a result, for example, without generating an undesirable travel path where the vehicle cuts in a congested lane from another lane in the middle of a congested section, it becomes possible to generate a more appropriate travel path of the vehicle compared to conventional ones. Then, by providing driving assistance based on the generated travel path, the driving assistance can be appropriately provided.

BRIEF DESCRIPTION OF DRAWINGS

FIG. 3 is a diagram showing an example of traffic congestion information.

DESCRIPTION OF EMBODIMENTS

Figure 1:
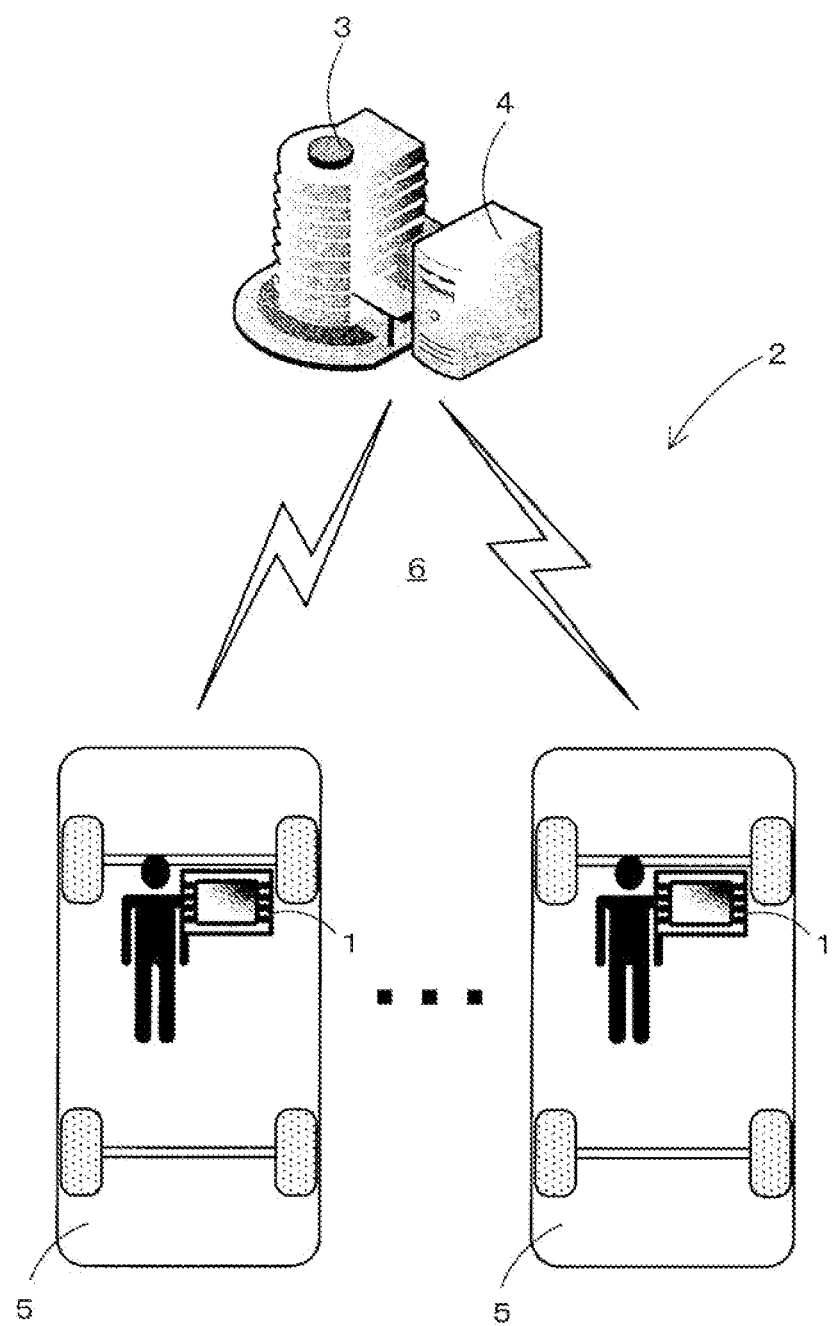
FIG. 1 is a schematic configuration diagram showing a driving assistance system according to the present embodiment.
Figure 2:
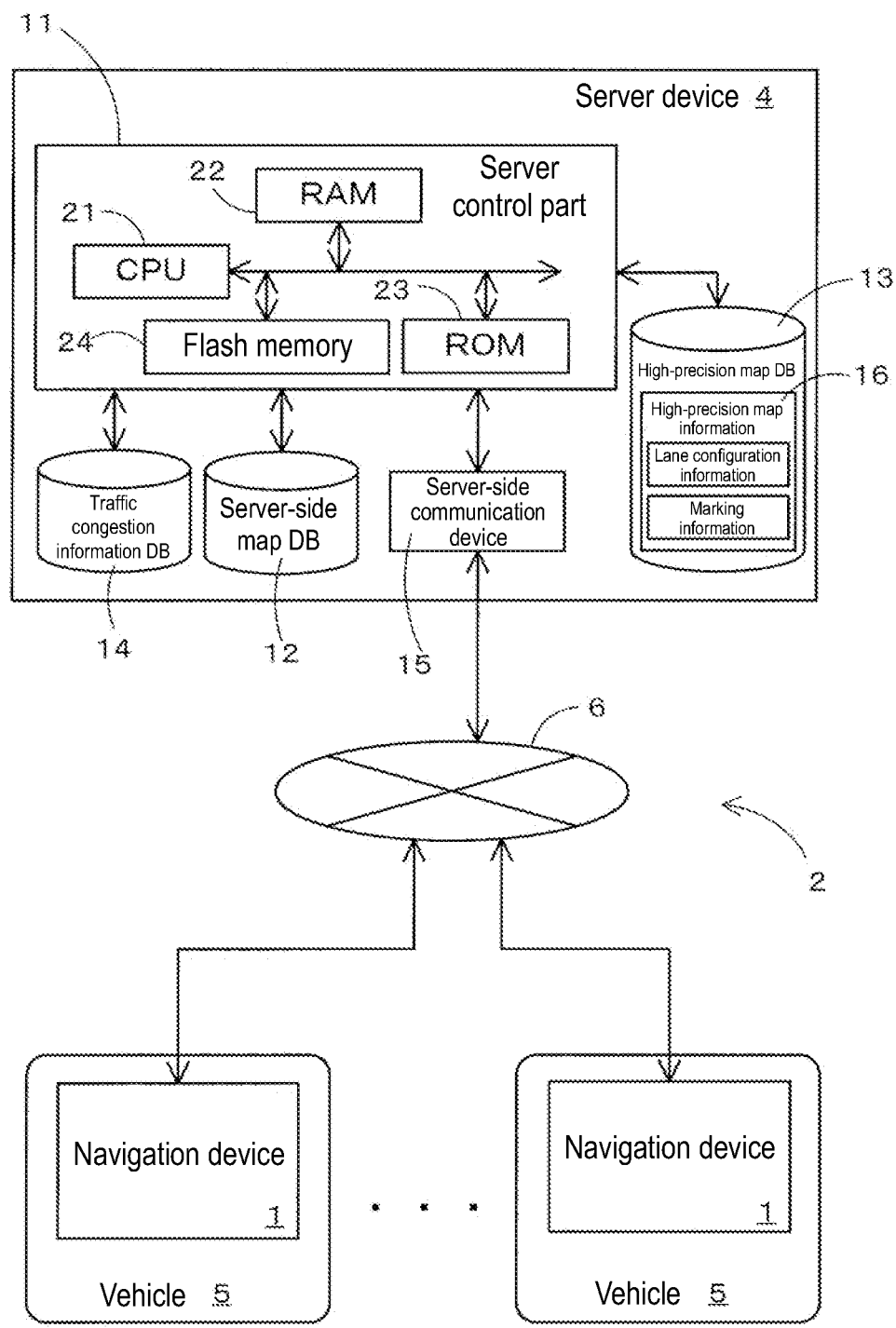
FIG. 2 is a block diagram showing a configuration of the driving assistance system according to the present embodiment.

One embodiment in which a driving assistance device according to the present disclosure is embodied into a navigation device 1 will be described in detail below with reference to the drawings. First, a schematic configuration of a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 each mounted on a vehicle 5 to provide various types of assistance related to autonomous driving of the vehicle 5. In addition, the server device 4 and the navigation devices 1 are configured to be able to perform transmission and reception of electronic data with each other through a communication network 6.

Note that instead of the navigation device 1, other in-vehicle devices mounted on the vehicle 5 or a vehicle control device that performs control for the vehicle 5 may be used.

Here, the vehicle 5 is a vehicle that can perform assistance travel by autonomous driving assistance in which the vehicle autonomously travels on a preset route or along a road independently of user's driving operations, in addition to manual driving travel in which the vehicle travels based on user's driving operations.

In addition, a configuration may be adopted in which autonomous driving assistance is provided for all road sections or is provided only while the vehicle travels on a specific road section (e.g., an expressway having a gate (it does not matter whether or not there is a person or whether or not a toll is collected) at a boundary). The following description is made assuming that an autonomous driving section in which autonomous driving assistance for the vehicle is provided also includes a parking lot in addition to all road sections including general roads and expressways, and that autonomous driving assistance is basically provided during a period from when the vehicle starts traveling until the vehicle finishes traveling (until the vehicle is parked). Note, however, that it is desirable that instead of always providing autonomous driving assistance when the vehicle travels on an autonomous driving section, autonomous driving assistance be provided only in a situation in which provision of autonomous driving assistance is selected by a user (e.g., an autonomous driving start button is turned on) and it is determined that travel by autonomous driving assistance can be performed. On the other hand, the vehicle 5 may be a vehicle that can only perform assistance travel by autonomous driving assistance.

In vehicle control performed by autonomous driving assistance, for example, a current location of the vehicle, a lane in which the vehicle travels, and the location of an obstacle around the vehicle are detected whenever necessary, and as will be described later, vehicle control of steering, a drive source, a brake, etc., is autonomously performed so that the vehicle travels along a travel path generated by the navigation device 1 and at a speed in accordance with a speed plan created. Note that in assistance travel by autonomous driving assistance of the present embodiment, for a lane change, a left or right turn, and a parking operation, too, travel is performed by performing the above-described vehicle control by autonomous driving assistance, but a configuration may be adopted in which special travel such as a lane change, a left or right turn, and a parking operation is performed by manual driving instead of performing travel by autonomous driving assistance.

Meanwhile, the navigation device 1 is an in-vehicle device mounted on the vehicle 5 to display a map of an area around the location of the vehicle 5 based on map data included in the navigation device 1 or map data and traffic congestion information obtained from an external source, or perform user's input of a destination, or display a current location of the vehicle on a map image, or provide guidance on movement along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into lanes), selection of a parking location where the vehicle is parked at a destination, and a speed plan indicating vehicle speed at which the vehicle travels. Note that details of the navigation device 1 will be described later.

In addition, the server device 4 is an information management server that collects and accumulates probe information (material information), as appropriate, that includes a current time, travel information, etc., from each vehicle traveling across the country, and generates various types of assistance information about roads (e.g., road closure information, traffic accident information, traffic congestion information, and trip time) from the accumulated probe information, and delivers the generated assistance information to the navigation devices 1 or performs various processes using the assistance information. Particularly, in the present embodiment, the server device 4 collects, from each vehicle 5, the coordinates of a current location of the vehicle 5, vehicle speed, and a captured image obtained by capturing an area around the vehicle 5 with an in-vehicle camera provided in the vehicle 5, and performs statistics or analysis on each piece of the collected information, thereby generating data (traffic congestion information) representing traffic congestion conditions for each lane, and delivers the data to the vehicles 5.

In addition, the server device 4 also performs a route search in response to a request from a navigation device 1. Specifically, information required for a route search such as a point of departure and a destination is transmitted together with a route search request from a navigation device 1 to the server device 4 (note, however, that in a case of re-searching, information about a destination does not necessarily need to be transmitted). Then, the server device 4 having received the route search request performs a route search using map information included in the server device 4, to identify a recommended route from the point of departure to the destination. Thereafter, the identified recommended route is transmitted to the navigation device 1 which is a source of the request. The navigation device 1 can provide a user with information about the received recommended route, or can also generate, using the recommended route, various types of assistance information about autonomous driving assistance as will be described later.

Furthermore, the server device 4 includes high-precision map information which is map information with higher precision, separately from normal map information used for the above-described route search. The high-precision map information includes, for example, information about the lane configurations of roads (lane-by-lane road configurations, curvatures, lane widths, etc.) and markings (centerlines, lane lines, edge lines, guidelines, etc.) painted on the roads. In addition to the information, information about intersections, information about parking lots, etc., are also included. In response to a request from a navigation device 1, the server device 4 delivers the above-described traffic congestion information and high-precision map information, and the navigation device 1 generates various types of assistance information about autonomous driving assistance as will be described later, using the traffic congestion information and high-precision map information delivered from the server device 4. Note that the high-precision map information is basically map information targeting only a road (link) and an area around the road, but may be map information that also includes an area other than the area around the road.

Note, however, that the above-described route search process does not necessarily need to be performed by the server device 4, and if a navigation device 1 has map information, then the navigation device 1 may perform the route search process. In addition, high-precision map information may be included in advance in the navigation device 1, instead of being delivered from the server device 4.

In addition, the communication network 6 includes multiple base stations disposed all over the country; and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a telecommunications company, the base station serves as an end of the communication network 6 and plays a role in relaying communication of navigation devices 1 present in an area (cell) where radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a high-precision map DB 13, a traffic congestion information DB 14, and a server-side communication device 15.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 includes various types of means serving as processing algorithms with an ECU of a navigation device 1 which will be described later.

Meanwhile, the server-side map DB 12 is storage means for storing server-side map information which is the latest version of map information registered based on input data from an external source and input operations. Here, the server-side map information includes a road network and various types of information required for a route search, route guidance, and map display. For example, there are included network data including nodes and links that indicate a road network, link data about roads (links), node data about node points, intersection data about each intersection, point data about points such as facilities, map display data for displaying a map, search data for searching for a route, and retrieval data for retrieving a point.

In addition, the high-precision map DB 13 is storage means for storing high-precision map information 16 which is map information with higher precision than the above-described server-side map information. The high-precision map information 16 is, particularly, map information that stores more detailed information about roads, parking lots, etc., where vehicles are to travel. In the present embodiment, the high-precision map information 16 includes, for example, for roads, information about lane configurations (lane-by-lane road configurations, curvatures, lane widths, etc.) and markings (centerlines, lane lines, edge lines, guidelines, etc.) painted on the roads. Furthermore, the high-precision map information 16 records data representing road gradients, cants, banks, merge areas, a location where the number of lanes decreases, a location where road width becomes narrower, railroad crossings, etc., and records: for a corner, data representing the radius of curvature, an intersection, a T-junction, the entry and exit of the corner, etc.; for road attributes, data representing downhill slopes, uphill slopes, etc.; and for the types of road, data representing general roads such as national highways, prefectural highways, and narrow streets, and toll roads such as national expressways, urban expressways, automobile roads, general toll roads, and toll bridges. Particularly, in the present embodiment, there is also stored information that identifies, in addition to the number of lanes on a road, a passage segment in a traveling direction for each lane and a connection between roads for each lane (specifically, a correspondence between a lane included in a road before passing through an intersection and a lane included in a road after passing through the intersection). Furthermore, there is also stored speed limits set for roads. In addition, the high-precision map information is basically map information targeting only a road (link) and an area around the road, but may be map information that also includes an area other than the area around the road. In addition, although in the example shown in FIG. 2, the server-side map information stored in the server-side map DB 12 and the high-precision map information 16 are different pieces of map information, the high-precision map information 16 may be a part of the server-side map information.

Meanwhile, the traffic congestion information DB 14 is storage means for cumulatively storing information (traffic congestion information) that identifies traffic congestion conditions for each lane and that is generated by performing statistics or analysis on probe information collected from each vehicle. Note that in the present embodiment, probe information collected from each vehicle includes, particularly, (a) a captured image having been captured with an in-vehicle camera provided in the vehicle, (b) the coordinates of the location of the vehicle and vehicle speed at the time of capturing each frame included in the captured image, and (c) a link on which the vehicle currently travels and a time of entry into the link. By performing statistics or analysis on those pieces of probe information, in the present embodiment, traffic congestion conditions are determined, for example, at two levels, "free flow" and "congested". Note, however, that the traffic congestion conditions may be determined at three levels, "free flow", "busy", and "congested", or at four or more levels. In addition, the traffic congestion conditions may be identified by average vehicle speed or trip time.

FIG. 3 is a diagram showing an example of traffic congestion information that identifies traffic congestion conditions for each lane and that is stored in the traffic congestion information DB 14. As shown in FIG. 3, the traffic congestion information that identifies traffic congestion conditions for each lane includes information that identifies the date and time on which a determination for traffic congestion conditions is made; and information that identifies, on a lane-by-lane basis, a starting point (a point at which traffic congestion starts in a traveling direction) and an end point (a point at which the traffic congestion ends in the traveling direction) of a section having the traffic congestion. Specifically, "statistics date and time", "section starting point", 0"section end point", "lane No.", and "traffic congestion conditions" are included in this order. Note that the "section starting point" and the "section end point" each are identified by a link ID and the distance from a starting point of a link. For example, the example shown in FIG. 3 shows that there is traffic congestion between a location 20 m from a starting point of a link with the link ID "100001" and a location 40 m from a starting point of a link with the link ID "100004". Note, however, that instead of the "section end point", "traffic congestion length" indicating the length of a traffic congestion section from the "section starting point" may be included. Note that the "lane No." defines, for example, a plurality of lanes included in a link, as 1, 2, 3 . . . in turn from the left. For example, in a case of the link ID "100001" and the lane No. "1", it indicates the far left lane of the link ID "100001". Note that in the example shown in FIG. 3, the information about traffic congestion conditions for each lane only includes information on a section and a lane that are determined to be "congested", and a section and a lane that are not included in the information are "free flow" or "unknown (due to a limited amount of information, traffic congestion conditions cannot be identified)", but the information may also include information on a section and a lane that are determined to be "free flow".

In response to a request from a navigation device 1, the server device 4 delivers traffic congestion information that identifies traffic congestion conditions for each lane and that is stored in the traffic congestion information DB 14 to the navigation device 1. On the other hand, the navigation device 1 to which the traffic congestion information that identifies traffic congestion conditions for each lane has been delivered generates various types of assistance information about autonomous driving assistance as will be described later, using the delivered traffic congestion information.

Meanwhile, the server-side communication device 15 is a communication device for performing communication with the navigation device 1 of each vehicle 5 through the communication network 6. In addition, besides the navigation devices 1, it is also possible to receive traffic information including pieces of information such as traffic congestion information, regulation information, and traffic accident information that are transmitted from an Internet network, traffic information centers, e.g., a VICS (registered trademark: Vehicle Information and Communication System) center, etc.

Figure 4:
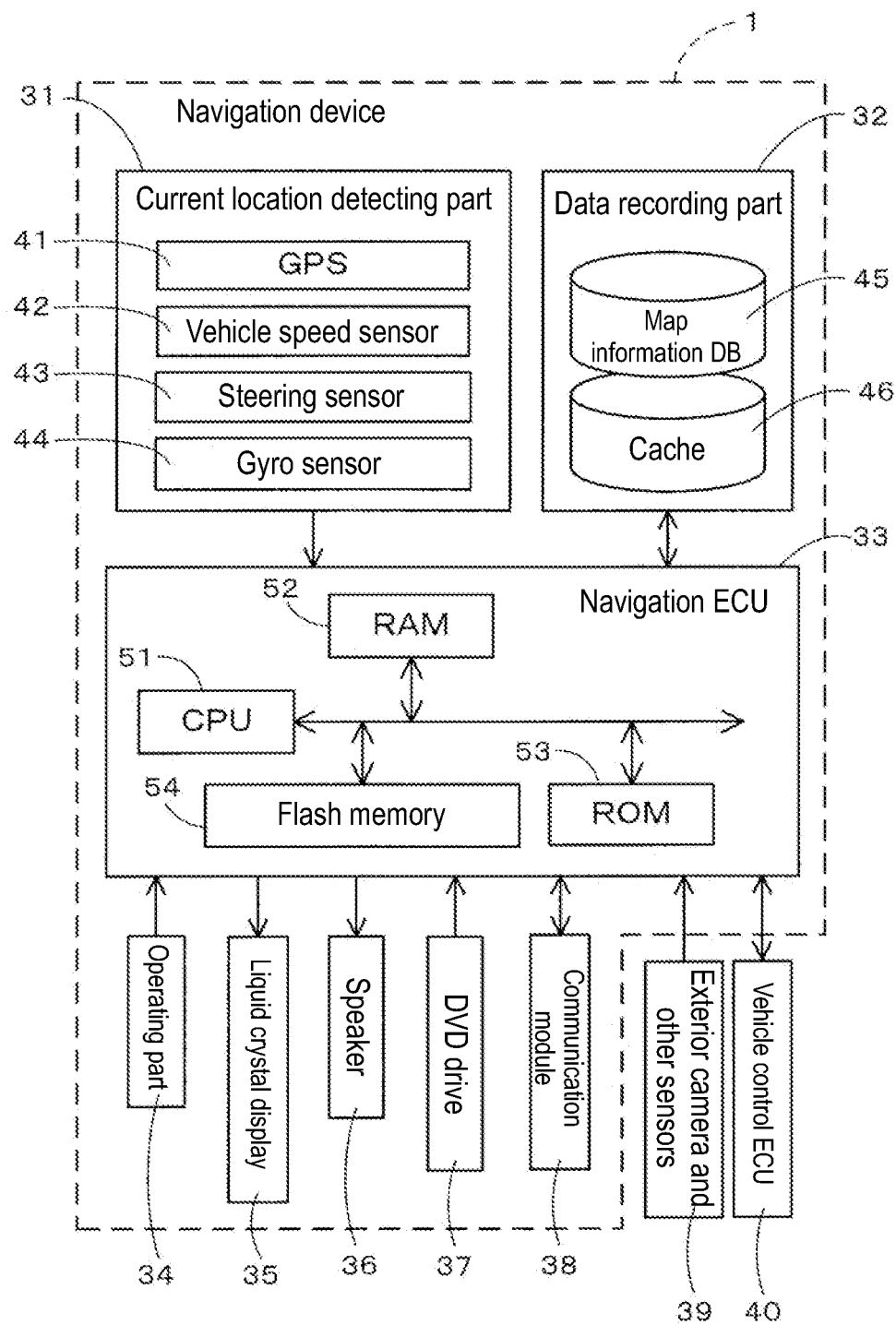
FIG. 4 is a block diagram showing a navigation device according to the present embodiment.

Next, a schematic configuration of the navigation device 1 mounted on the vehicle 5 will be described using FIG. 4. FIG. 4 is a block diagram showing the navigation device 1 according to the present embodiment.

As shown in FIG. 4, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user a map of an area around the vehicle, information about a guidance route (a planned travel route of the vehicle) set on the navigation device 1, etc.; a speaker 36 that outputs voice guidance about route guidance; a DVD drive 37 that reads a DVD which is a storage medium; and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 that performs various types of control on the vehicle having the navigation device 1 mounted thereon, such that the navigation device 1 and the vehicle control ECU 40 can perform two-way communication.

The components included in the navigation device 1 will be described in turn below.

The current location detecting part 31 includes a GPS 41, a vehicle speed sensor 42, a steering sensor 43, a gyro sensor 44, etc., and can detect the current vehicle location and orientation, a travel speed of the vehicle, a current time, etc. Here, particularly, the vehicle speed sensor 42 is a sensor for detecting the moving distance and vehicle speed of the vehicle, and generates pulses according to the rotation of drive wheels of the vehicle and outputs a pulse signal to the navigation ECU 33. Then, the navigation ECU 33 counts the generated pulses, thereby calculating the rotational speed of the drive wheels and a moving distance. Note that the navigation device 1 does not need to include all of the above-described four types of sensors, and may be configured to include only one or a plurality of types of sensors among these sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. In addition, in the present embodiment, as described above, the server device 4 searches for a route to a destination, and thus, the map information DB 45 may be omitted. Even if the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

Meanwhile, the cache 46 is storage means for saving high-precision map information 16 and traffic congestion information that have been delivered from the server device 4 in the past. A saving period can be set as appropriate, and may be, for example, a predetermined period (e.g., one month) after storage or a period until an ACC power supply (accessory power supply) of the vehicle is turned off. In addition, after the amount of data stored in the cache 46 reaches an upper limit, the data may be sequentially deleted in order of oldest to newest. The navigation ECU 33 generates various types of assistance information about autonomous driving assistance, using the high-precision map information 16 and traffic congestion information stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route is searched, etc., a ROM 53 having recorded therein a program for control, an autonomous driving assistance program (see FIG. 5) which will be described later, etc., and a flash memory 54 that stores a program read from the ROM 53. Note that the navigation ECU 33 includes various types of means serving as processing algorithms. For example, planned travel route obtaining means obtains a planned travel route on which the vehicle travels. Traffic congestion conditions obtaining means obtains, from an external source, traffic congestion conditions for each lane on the planned travel route. Travel path generating means generates a travel path that identifies a lane change location at which a lane change is made to a recommended lane, targeting a section from a current location of the vehicle to a location a predetermined distance ahead of the vehicle and using map information including at least information about markings and the traffic congestion conditions for each lane, the recommended lane being recommended for the vehicle to travel in on a road included in the planned travel route. Driving assistance means provides driving assistance for the vehicle, based on the travel path generated by the travel path generating means.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, information on guidance along a guidance route (planned travel route), news, weather forecasts, time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., that are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a roadside-device-to-vehicle communication device that performs communication with a roadside device. In addition, the communication module 38 is also used to transmit and receive route information searched by the server device 4, high-precision map information 16, traffic congestion information, etc., to/from the server device 4.

In addition, the exterior camera 39 includes, for example, a camera that uses a solid-state imaging device such as a CCD, and is attached to the upper side of a front bumper of the vehicle and is placed such that an optical-axis direction faces downward at a predetermined angle relative to the horizontal. When the vehicle travels on an autonomous driving section, the exterior camera 39 captures an image of an area ahead in a traveling direction of the vehicle. In addition, the navigation ECU 33 performs image processing on the captured image having been captured, thereby detecting markings painted on a road on which the vehicle travels, and obstacles such as other vehicles around the vehicle, and generates various types of assistance information about autonomous driving assistance, based on results of the detection. For example, when an obstacle has been detected, a new travel path where the vehicle travels avoiding or following the obstacle is generated. Note that the exterior camera 39 may be configured to be disposed on the rear or side of the vehicle other than the front. Note also that for means for detecting obstacles, a sensor such as millimeter-wave radar or a laser sensor, vehicle-to-vehicle communication, or roadside-device-to-vehicle communication may be used instead of a camera.

In addition, the vehicle control ECU 40 is an electronic control unit that controls the vehicle having the navigation device 1 mounted thereon. In addition, driving parts of the vehicle such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override has been performed by the user during autonomous driving assistance, the fact that the override has been performed is detected.

Here, the navigation ECU 33 transmits various types of assistance information about autonomous driving assistance generated by the navigation device 1 to the vehicle control ECU 40 through the CAN after starting traveling. Then, the vehicle control ECU 40 provides autonomous driving assistance to be provided after starting traveling, using the received various types of assistance information. The assistance information includes, for example, a travel path recommended for the vehicle to travel along and a speed plan indicating vehicle speed at which the vehicle travels.

Figure 5:
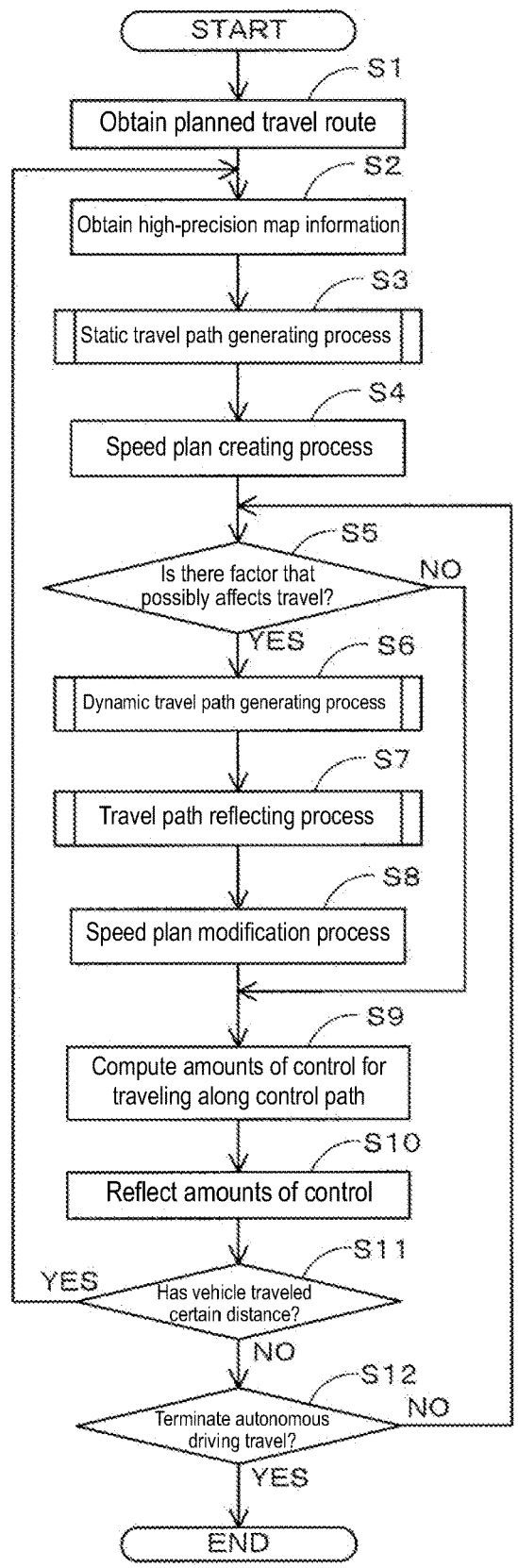
FIG. 5 is a flowchart of an autonomous driving assistance program according to the present embodiment.

Next, an autonomous driving assistance program executed by the CPU 51 of the navigation device 1 according to the present embodiment that has the above-described configuration will be described based on FIG. 5. FIG. 5 is a flowchart of the autonomous driving assistance program according to the present embodiment. Here, the autonomous driving assistance program is a program that is executed after the ACC power supply (accessory power supply) of the vehicle is turned on and when travel of the vehicle by autonomous driving assistance has started, and that performs assistance travel by autonomous driving assistance in accordance with assistance information generated by the navigation device 1. In addition, programs shown in flowcharts of the following FIGS. 5, 7, 18, and 21 are stored in the RAM 52 or the ROM 53 included in the navigation device 1, and are executed by the CPU 51.

First, in the autonomous driving assistance program, at step (hereinafter, abbreviated as S) 1, the CPU 51 obtains a route on which the vehicle is planned to travel in the future (hereinafter, referred to as planned travel route). Note that the planned travel route of the vehicle is, for example, a recommended route to a destination that is searched by the server device 4 by the user setting the destination. Note that when a destination is not set, a route on which the vehicle travels along a road from a current location of the vehicle may be a planned travel route.

In addition, when a recommended route is searched, first, the CPU 51 transmits a route search request to the server device 4. Note that the route search request includes a terminal ID that identifies the navigation device 1 which is a sender of the route search request; and information that identifies a point of departure (e.g., a current location of the vehicle) and a destination. Note that upon re-searching, information that identifies a destination is not necessarily needed. Thereafter, the CPU 51 receives searched-route information transmitted from the server device 4 in response to the route search request. The searched-route information is information that identifies a recommended route (center route) from the point of departure to the destination (e.g., a series of links included in the recommended route) which is searched by the server device 4 based on the transmitted route search request and using the latest version of map information. The search is performed using, for example, the publicly known Dijkstra's algorithm.

Note that in the above-described search for a recommended route, it is desirable to select a parking location (parking space) recommended to park the vehicle in a parking lot at the destination, and search for a recommended route to the selected parking location. Namely, it is desirable that a recommended route to be searched also include a route representing movement of the vehicle in the parking lot, in addition to a route to the parking lot. In addition, for the selection of a parking location, it is desirable to select a parking location that reduces a user's burden, taking into account also movement on foot after parking the vehicle in addition to movement of the vehicle to the parking location.

Then, at S2, the CPU 51 obtains high-precision map information 16, targeting a section within a predetermined distance from the current location of the vehicle along the planned travel route which is obtained at the above-described S1. For example, high-precision map information 16 is obtained targeting a portion of the planned travel route included in a secondary mesh in which the vehicle is currently located. Note, however, that an area for which high-precision map information 16 is to be obtained can be changed as appropriate, and for example, high-precision map information 16 for an area within 3 km from the current location of the vehicle along the planned travel route may be obtained. In addition, high-precision map information 16 may be obtained targeting the entire planned travel route.

Figure 6:
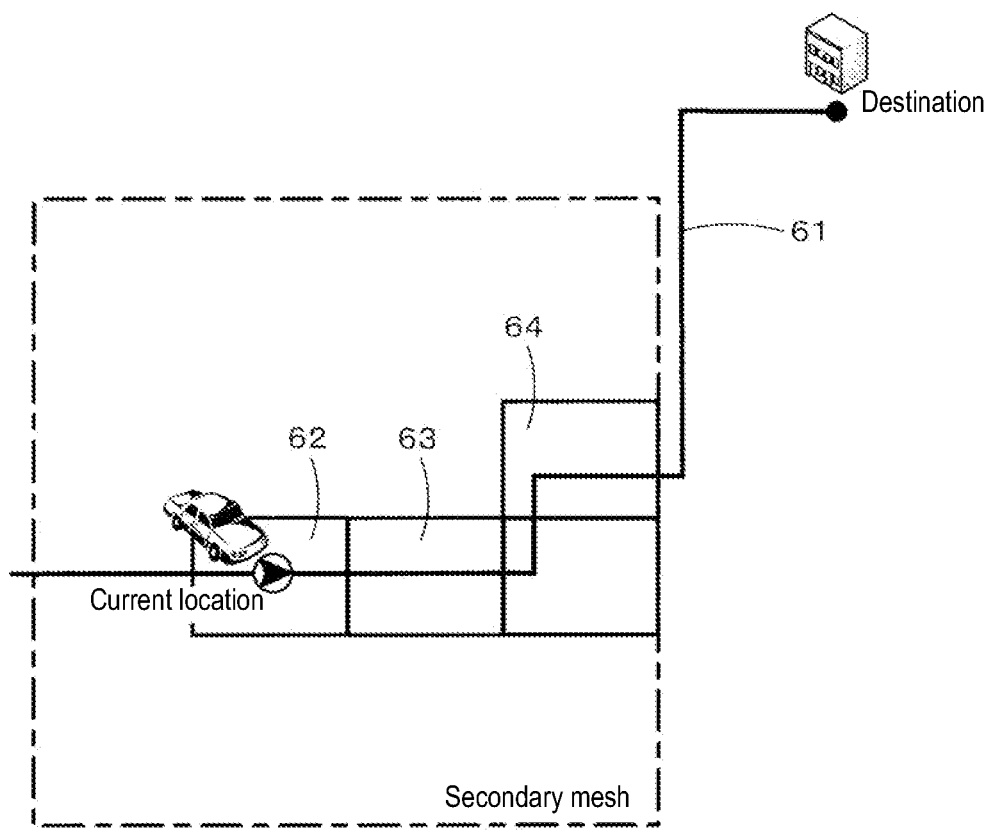
FIG. 6 is a diagram showing an area for which high-precision map information is obtained.

Here, the high-precision map information 16 is, as shown in FIG. 6, sectioned into rectangular shapes (e.g., 500 m×1 km) and stored in the high-precision map DB 13 of the server device 4. Thus, for example, when a planned travel route 61 is obtained as shown in FIG. 6, high-precision map information 16 is obtained targeting areas 62 to 64 that include a portion of the planned travel route 61 included in a secondary mesh including a current location of the vehicle. The high-precision map information 16 includes, for example, information about the lane configurations of roads, lane widths, and markings (centerlines, lane lines, edge lines, guidelines, etc.) painted on the roads. In addition to the information, information about intersections, information about parking lots, etc., are also included.

In addition, the high-precision map information 16 is basically obtained from the server device 4, but when there is high-precision map information 16 for areas that is already stored in the cache 46, the high-precision map information 16 is obtained from the cache 46. In addition, the high-precision map information 16 obtained from the server device 4 is temporarily stored in the cache 46.

Thereafter, at S3, the CPU 51 performs a static travel path generating process (FIG. 7) which will be described later.

Here, the static travel path generating process is a process of generating a static travel path which is a travel path recommended for the vehicle to travel along on roads included in the planned travel route, based on the planned travel route of the vehicle, the high-precision map information 16 obtained at the above-described S2, and furthermore, traffic congestion conditions for each lane obtained from the external server device 4. Particularly, the CPU 51 identifies, as a static travel path, a travel path recommended for the vehicle to travel along in units of lanes included in the planned travel route. Namely, the static travel path is a travel path where the vehicle travels in a recommended lane that is recommended for the vehicle to travel in, and when a lane change is involved, a lane change location at which a lane change is made to the recommended lane is also identified. Note that a static travel path is generated targeting, as will be described later, a section from a current location of the vehicle to a location a predetermined distance ahead in a traveling direction of the vehicle (e.g., an area within a secondary mesh in which the vehicle is currently located or all sections present before reaching the destination). Note that the predetermined distance can be changed as appropriate, and a static travel path is generated targeting a region including at least an area outside a range (detection range) in which road conditions around the vehicle can be detected using the exterior camera 39 and other sensors.

Then, at S4, the CPU 51 creates a speed plan for the vehicle which is used upon traveling along the static travel path generated at the above-described S3, based on the high-precision map information 16 obtained at the above-described S2. For example, travel speeds of the vehicle recommended upon traveling along the static travel path are calculated taking into account speed limit information and speed change points (e.g., intersections, curves, railroad crossings, and crosswalks) present on the planned travel route.

Then, the speed plan created at the above-described S4 is stored in the flash memory 54, etc., as assistance information used for autonomous driving assistance. In addition, an acceleration plan indicating acceleration and deceleration of the vehicle required to implement the speed plan created at the above-described S4 may also be created as assistance information used for autonomous driving assistance.

Subsequently, at S5, the CPU 51 determines, as road conditions around the vehicle, particularly, whether a factor that affects travel of the vehicle is present around the vehicle, by performing image processing on a captured image having been captured with the exterior camera 39. Here, the "factor that affects travel of the vehicle" to be determined at the above-described S5 is a dynamic factor that changes in real time, and static factors based on road structures are excluded. The factor that affects travel of the vehicle corresponds, for example, to another vehicle that travels or is parked ahead in a traveling direction of the vehicle, a congested vehicle, a pedestrian located ahead in the traveling direction of the vehicle, or a construction zone present ahead in the traveling direction of the vehicle. On the other hand, intersections, curves, railroad crossings, merge areas, lane reduction areas, etc., are excluded. In addition, even if there is another vehicle, a pedestrian, or a construction zone, if there is no possibility of them overlapping a future travel path of the vehicle (e.g., if they are located away from the future travel path of the vehicle), then they are excluded from the "factor that affects travel of the vehicle". In addition, for means for detecting a factor that possibly affects travel of the vehicle, a sensor such as millimeter-wave radar or a laser sensor, vehicle-to-vehicle communication, or roadside-device-to-vehicle communication may be used instead of a camera.

In addition, for example, the real-time location, etc., of each vehicle traveling on a road across the country may be managed by an external server, and the CPU 51 may obtain the location of another vehicle located around the vehicle from the external server to perform the determination process at the above-described S5.

If it is determined that a factor that affects travel of the vehicle is present around the vehicle (S5: YES), then processing transitions to S6. On the other hand, if it is determined that a factor that affects travel of the vehicle is not present around the vehicle (S5: NO), then processing transitions to S9.

At S6, the CPU 51 performs a dynamic travel path generating process (FIG. 18) which will be described later. Here, in the dynamic travel path generating process, there is generated, as a dynamic travel path, a new path for the vehicle to travel from the current location of the vehicle, and avoid or follow the "factor that affects travel of the vehicle" detected at the above-described S5, and then return to the static travel path. Note that the dynamic travel path is, as will be described later, generated targeting a section including the "factor that affects travel of the vehicle". Note also that the length of the section varies depending on what the factor is. For example, when the "factor that affects travel of the vehicle" is another vehicle (lead vehicle) traveling ahead of the vehicle, as an example, there is generated, as a dynamic travel path, a path where the vehicle makes a lane change to the right to pass the lead vehicle, and then makes a lane change to the left to return to an original lane. Note that a dynamic travel path is generated based on road conditions around the vehicle which are obtained using the exterior camera 39 and other sensors, and thus, a region for which a dynamic travel path is to be generated is at least an area within a range (detection range) in which road conditions around the vehicle can be detected using the exterior camera 39 and other sensors.

Subsequently, at S7, the CPU 51 performs a travel path reflecting process (FIG. 21) which will be described later. Here, the travel path reflecting process is a process of reflecting the dynamic travel path which is newly generated at the above-described S6 in the static travel path generated at the above-described S3. Specifically, a cost of a portion of the static travel path included in an area from the current location of the vehicle to the end of the section including the "factor that affects travel of the vehicle" and a cost of a portion of at least one or more dynamic travel paths included in the area are calculated, and a travel path with a minimum cost is selected. Consequently, a part of the static travel path is replaced by the dynamic travel path as necessary. Note that depending on the situation, replacement by the dynamic travel path may not be performed, i.e., even if reflection of the dynamic travel path is performed, there may be no change in the static travel path generated at the above-described S3. Furthermore, when the dynamic travel path and the static travel path are identical paths, even if replacement is performed, there may be no change in the static travel path generated at the above-described S3.

Then, at S8, the CPU 51 modifies, for the static travel path in which the dynamic travel path has been reflected at the above-described S7, the speed plan for the vehicle created at the above-described S4, based on a change made by the reflected dynamic travel path. Note that when there is no change in the static travel path generated at the above-described S3 as a result of reflecting the dynamic travel path, the process at S8 may be omitted.

Subsequently, at S9, the CPU 51 computes the amounts of control for the vehicle to travel along the static travel path generated at the above-described S3 (when the dynamic travel path is reflected at the above-described S7, a path obtained after the reflection) at speeds in accordance with the speed plan created at the above-described S4 (when the speed plan is modified at the above-described S8, a plan obtained after the modification). Specifically, each of the amounts of control of an accelerator, a brake, a gear, and steering is computed. Note that the processes at S9 and S10 may be performed by the vehicle control ECU 40 that controls the vehicle, instead of the navigation device 1.

Thereafter, at S10, the CPU 51 reflects the amounts of control computed at S9. Specifically, the computed amounts of control are transmitted to the vehicle control ECU 40 through the CAN. The vehicle control ECU 40 performs vehicle control of each of the accelerator, the brake, the gear, and the steering based on the received amounts of control. As a result, it becomes possible to perform travel assistance control for traveling along the static travel path generated at the above-described S3 (when the dynamic travel path is reflected at the above-described S7, a path obtained after the reflection) at speeds in accordance with the speed plan created at the above-described S4 (when the speed plan is modified at the above-described S8, a plan obtained after the modification).

Then, at S11, the CPU 51 determines whether the vehicle has traveled a certain distance since the generation of a static travel path at the above-described S3. For example, the certain distance is 1 km.

If it is determined that the vehicle has traveled a certain distance since the generation of a static travel path at the above-described S3 (S11: YES), then processing returns to S2. Thereafter, a static travel path is generated again, targeting a section within the predetermined distance from a current location of the vehicle along the planned travel route (S2 to S4). Note that, in the first embodiment, every time the vehicle has traveled a certain distance (e.g., 1 km), a static travel path is repeatedly generated targeting a section within the predetermined distance from a current location of the vehicle along the planned travel route, but when the distance to the destination is short, a static travel path to the destination may be generated once at the time of starting traveling.

On the other hand, if it is determined that the vehicle has not traveled a certain distance since the generation of a static travel path at the above-described S3 (S11: NO), then it is determined whether to terminate the assistance travel by autonomous driving assistance (S12). A case of terminating the assistance travel by autonomous driving assistance includes a case in which the travel by autonomous driving assistance is intentionally canceled (override) by the user operating a control panel provided on the vehicle or by the user performing a steering wheel operation, a brake operation, etc., in addition to a case in which the vehicle has reached the destination.

If it is determined to terminate the assistance travel by autonomous driving assistance (S12: YES), then the autonomous driving assistance program is terminated. On the other hand, if it is determined to continue the assistance travel by autonomous driving assistance (S12: NO), then processing returns to S5.

Figure 7:
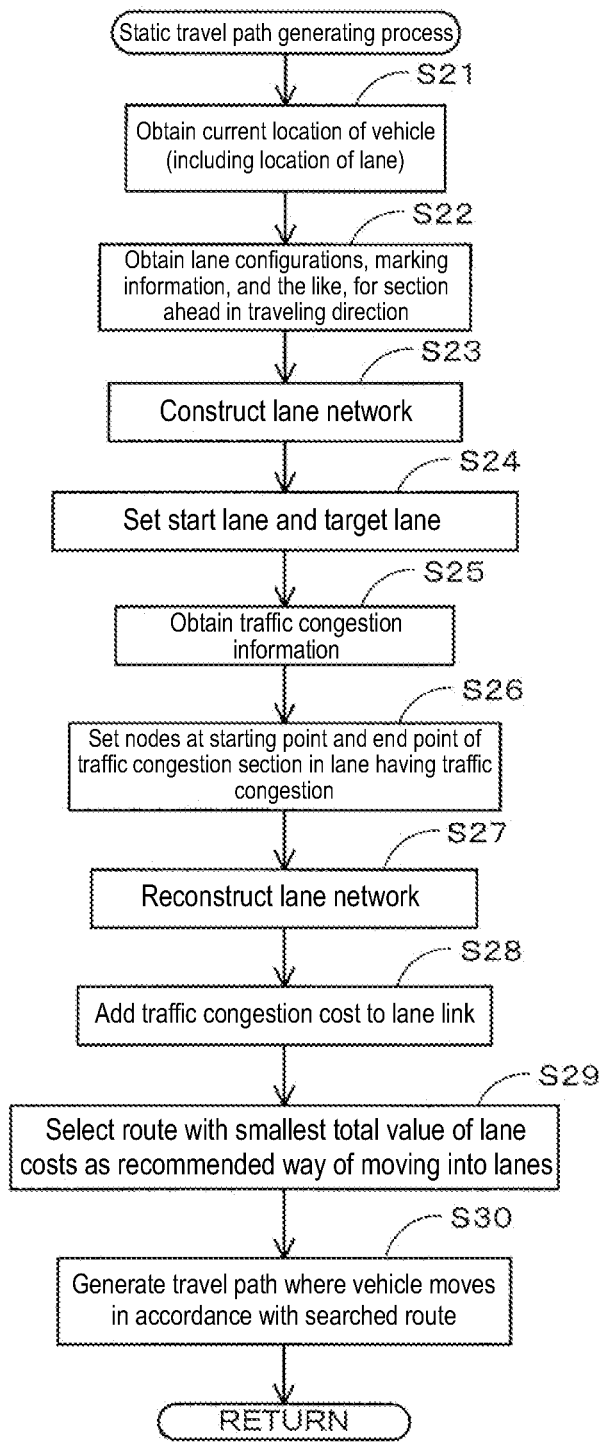
FIG. 7 is a flowchart of a subprocess program of a static travel path generating process.

Next, a subprocess of the static travel path generating process performed at the above-described S3 will be described based on FIG. 7. FIG. 7 is a flowchart of a subprocess program of the static travel path generating process.

First, at S21, the CPU 51 obtains a current location of the vehicle detected by the current location detecting part 31. Note that it is desirable to specifically identify the current location of the vehicle using, for example, high-precision GPS information or a high-precision location technique. Here, the high-precision location technique is a technique in which a white line or road surface painting information captured with a camera installed on the vehicle is detected by image recognition, and furthermore, the detected white line or road surface painting information is checked against, for example, the high-precision map information 16, by which a driving lane or a high-precision vehicle location can be detected. Furthermore, when the vehicle travels on a road having a plurality of lanes, a lane in which the vehicle travels is also identified.

Then, at S22, the CPU 51 obtains, based on the high-precision map information 16 obtained at the above-described S2, lane configurations, marking information, information about intersections, etc., targeting a section ahead in a traveling direction of the vehicle for which a static travel path is generated (e.g., an area within a secondary mesh including the current location of the vehicle). Note that the lane configurations and marking information obtained at the above-described S22 include information that identifies the number of lanes, lane widths, how and where the number of lanes increases or decreases when there is an increase or decrease in the number of lanes, a passage segment in a traveling direction for each lane, and a connection between roads for each lane (specifically, a correspondence between a lane included in a road before passing through an intersection and a lane included in a road after passing through the intersection), etc. In addition, the information about intersections includes information about the locations and configurations of ground objects placed at the intersections, in addition to the configurations of the intersections. Furthermore, the "ground objects placed at the intersections" include road surface markings painted on road surfaces, such as guidelines (white guidelines) and rhombic guide zones (diamond-shaped markings) placed at the center of the intersections, and structures such as poles.

Subsequently, at S23, the CPU 51 constructs a lane network, targeting the section ahead in the traveling direction of the vehicle for which a static travel path is generated, based on the lane configurations and marking information obtained at the above-described S22. Here, the lane network is a network representing movement into lanes that can be selected by the vehicle.

Figure 8:
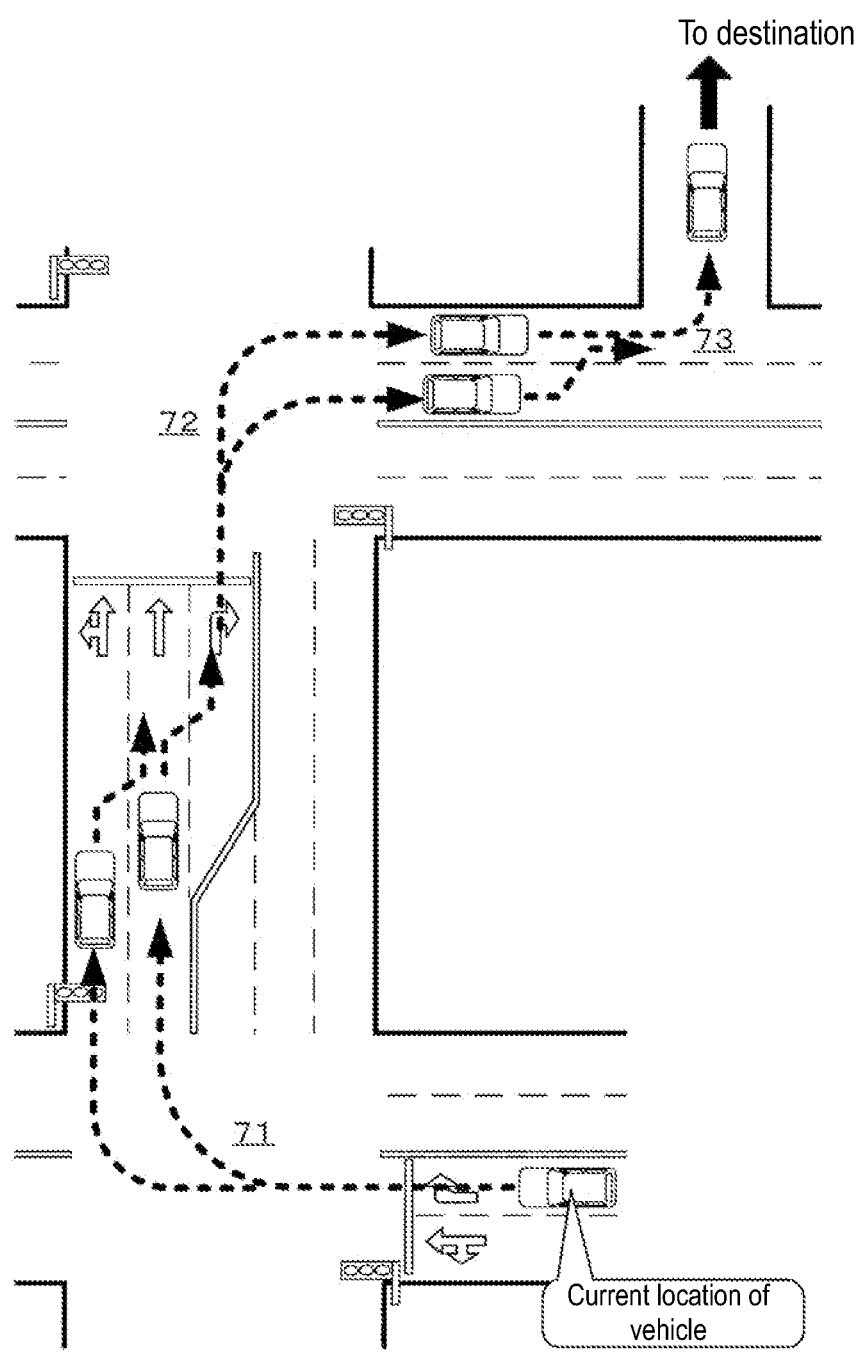
FIG. 8 is a diagram showing an example of a planned travel route of a vehicle.

Here, as an example of constructing a lane network at the above-described S23, for example, a case in which the vehicle travels on a planned travel route shown in FIG. 8 will be described as an example. The planned travel route shown in FIG. 8 is a route on which the vehicle travels straight ahead from its current location, and then turns right at a next intersection 71 and further turns right at a next intersection 72, too, and turns left at a next intersection 73. In the planned travel route shown in FIG. 8, for example, when the vehicle turns right at the intersection 71, the vehicle can enter a right lane or can also enter a left lane. Note, however, that since the vehicle needs to turn right at the next intersection 72, the vehicle needs to move into the far right lane at the time of entering the intersection 72. In addition, when the vehicle turns right at the intersection 72, too, the vehicle can enter a right lane or can also enter a left lane. Note, however, that since the vehicle needs to turn left at the next intersection 73, the vehicle needs to move into the far left lane at the time of entering the intersection 73. A lane network constructed targeting a section that allows such movement into lanes is shown in FIG. 9.

Figure 9:
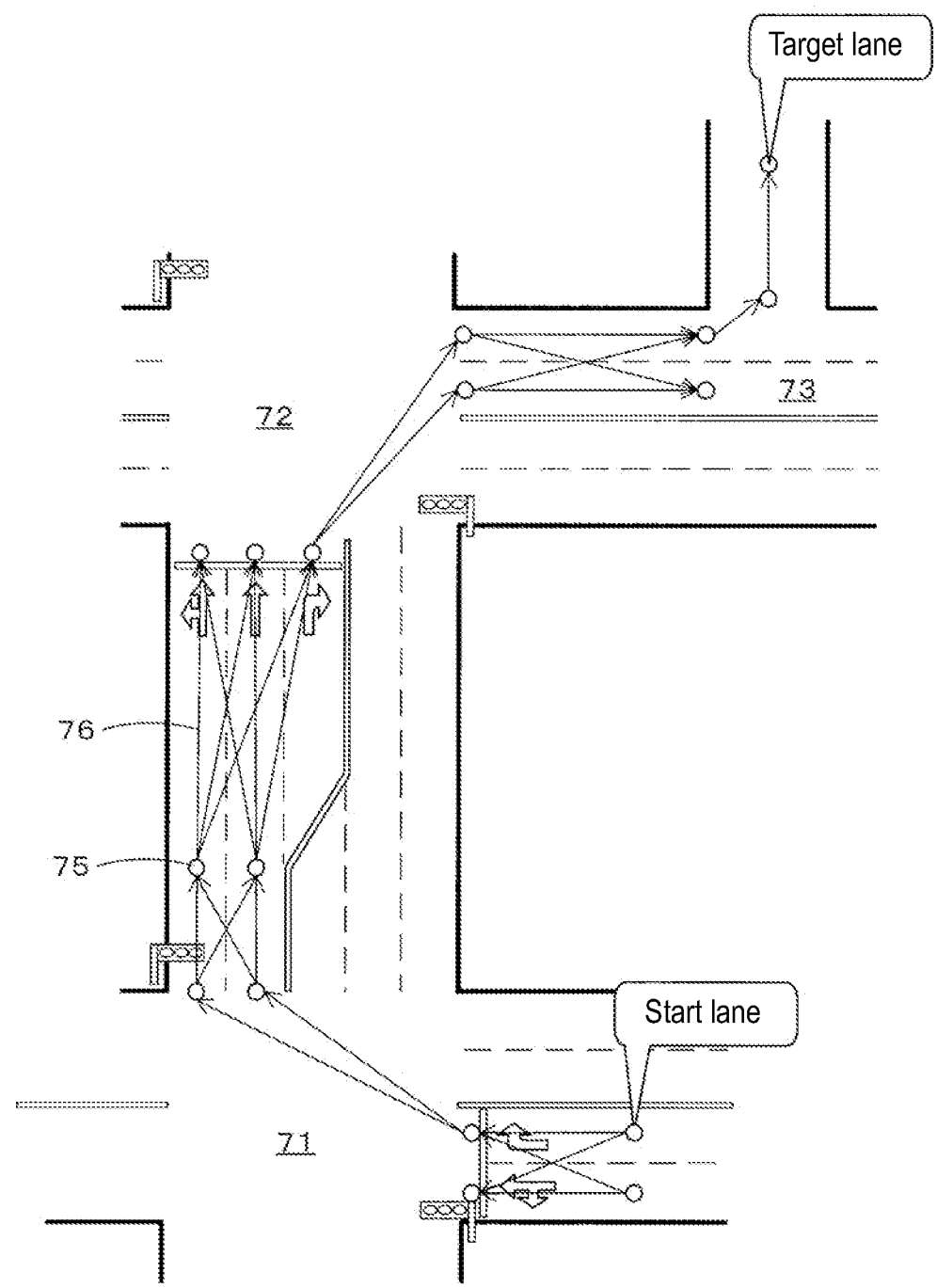
FIG. 9 is a diagram showing an example of a lane network constructed for the planned travel route shown in FIG. 8.

As shown in FIG. 9, in the lane network, a section ahead in a traveling direction of the vehicle for which a static travel path is generated is divided into a plurality of blocks (groups). Specifically, the section is divided, with a location where the vehicle enters an intersection, a location where the vehicle exits the intersection, and a location where the number of lanes increases or decreases being boundaries. A node point (hereinafter, referred to as lane node) 75 is set at a point in each lane located at a boundary of each divided block. Furthermore, a link (hereinafter, referred to as lane link) 76 that connects lane nodes 75 is set.

In addition, the above-described lane network includes, particularly, information that identifies, by a connection of lane nodes with a lane link at an intersection, a correspondence between a lane included in a road before passing through the intersection and a lane included in a road after passing through the intersection, i.e., a lane into which the vehicle can move after passing through the intersection from a lane used before passing through the intersection. Specifically, the lane network indicates that the vehicle can move between lanes corresponding to lane nodes that are connected by a lane link among lane nodes set on a road used before passing through an intersection and lane nodes set on a road used after passing through the intersection. To generate such a lane network, the high-precision map information 16 stores, for each road connected to an intersection, lane flags indicating a correspondence between lanes and set for each combination of a road that enters the intersection and a road that exits the intersection. When the CPU 51 constructs a lane network at the above-described S23, the CPU 51 forms a connection of lane nodes with a lane link at an intersection by referring to the lane flags.

Then, at S24, for the lane network constructed at the above-described S23, the CPU 51 sets a start lane (departure node), in which the vehicle starts moving, at a lane node located at a starting point of the lane network, and sets a target lane (target node), which is a target to which the vehicle moves, at a lane node located at an end point of the lane network. Particularly, when the end point of the lane network is the destination, a target lane is set at a point of entry into the destination (a point on a road near an entrance to the destination). Note that when the starting point of the lane network is a road with a plurality of lanes in each direction, a lane node corresponding to a lane in which the vehicle is currently located serves as a start lane. On the other hand, when the end point of the lane network is a road with a plurality of lanes in each direction, particularly, when the end point of the lane network is the destination, a lane node corresponding to a lane with a direction in which the destination is located (if the destination is present on the left side in the traveling direction, then the far left lane, and if the destination is present on the right side in the traveling direction, then the far right lane) serves as a target lane. On the other hand, in other cases, a lane node corresponding to the far left lane (in a case of left-hand traffic) serves as a target lane. Note that particularly, when the end point of the lane network is the destination, a lane set as a target lane also corresponds to a recommended lane that is recommended for the vehicle to travel in to enter the destination.

Subsequently, at S25, the CPU 51 obtains, from the server device 4, traffic congestion information indicating traffic congestion conditions for each lane, targeting the section for which a lane network is constructed at the above-described S23. The traffic congestion information is information that identifies, on a lane-by-lane basis, a starting point and an end point (traffic congestion length may be used instead of the end point) of a section having traffic congestion. Note that as described previously, the server device 4 periodically collects, as probe information and from each vehicle, the coordinates of a current location of the vehicle, vehicle speed, and a captured image obtained by capturing an area around the vehicle with an in-vehicle camera provided in the vehicle, and performs statistics or analysis on each piece of the collected information, thereby generating traffic congestion information indicating traffic congestion conditions for each lane, and cumulatively stores the traffic congestion information in the traffic congestion information DB 14 (FIG. 3). The traffic congestion information obtained by the navigation device 1 at the above-described S25 is the most recently generated traffic congestion information indicating traffic congestion conditions of a road at the present time.

Then, at S26, the CPU 51 newly sets, based on the traffic congestion information obtained at the above-described S25, lane nodes at locations corresponding to a starting point (a point at which traffic congestion starts in the traveling direction) and an end point (a point at which the traffic congestion ends in the traveling direction) of a traffic congestion section in the lane network constructed at the above-described S23. Note that when a road includes a plurality of lanes, basically, lane nodes are newly set not only in a lane having traffic congestion, but also in all lanes including a lane having no traffic congestion. Note, however, that lane nodes may be newly set only in a lane having traffic congestion.

Figure 10:
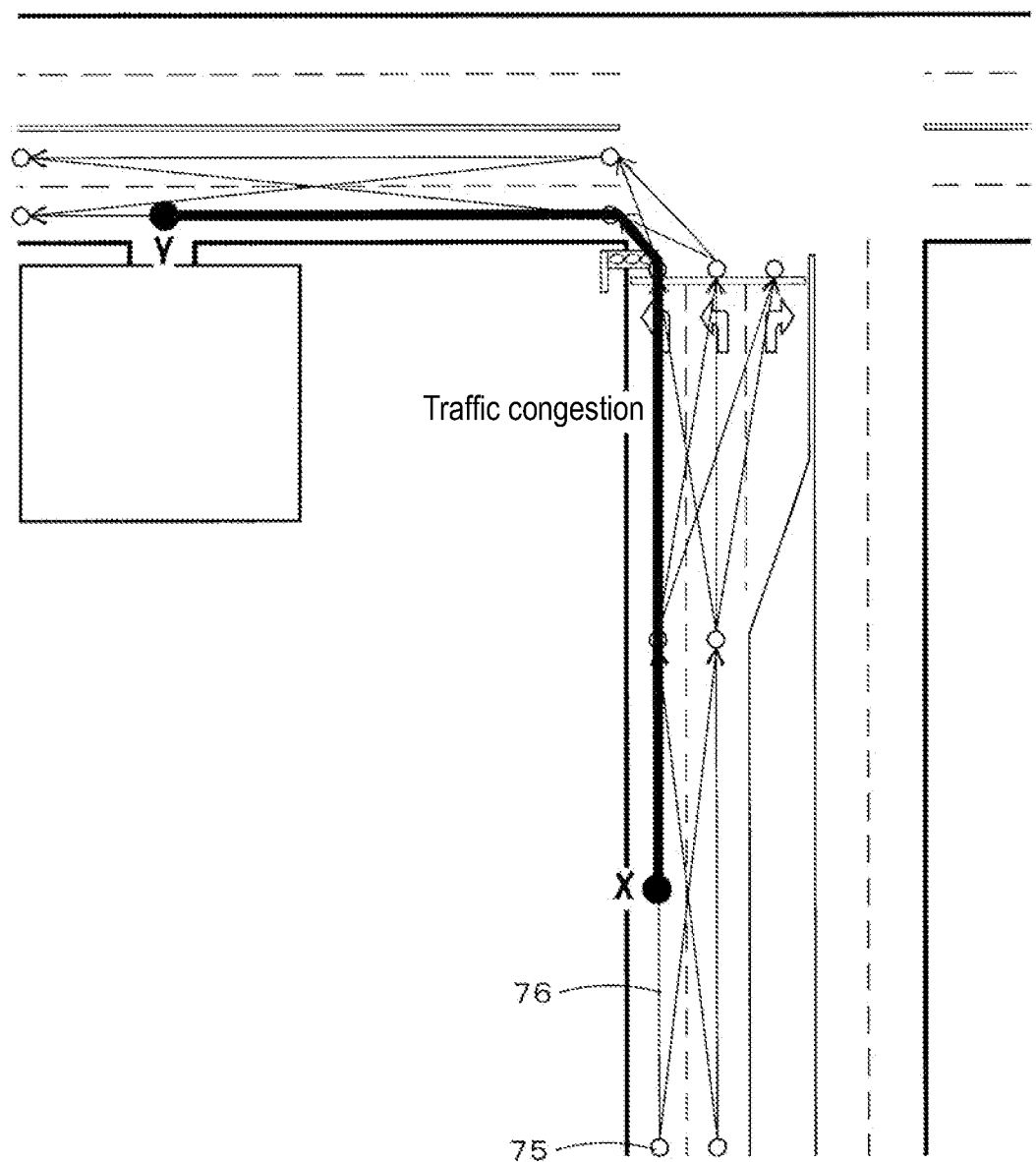
FIG. 10 is a diagram of a state in which traffic congestion information is matched to a lane network.
Figure 11:
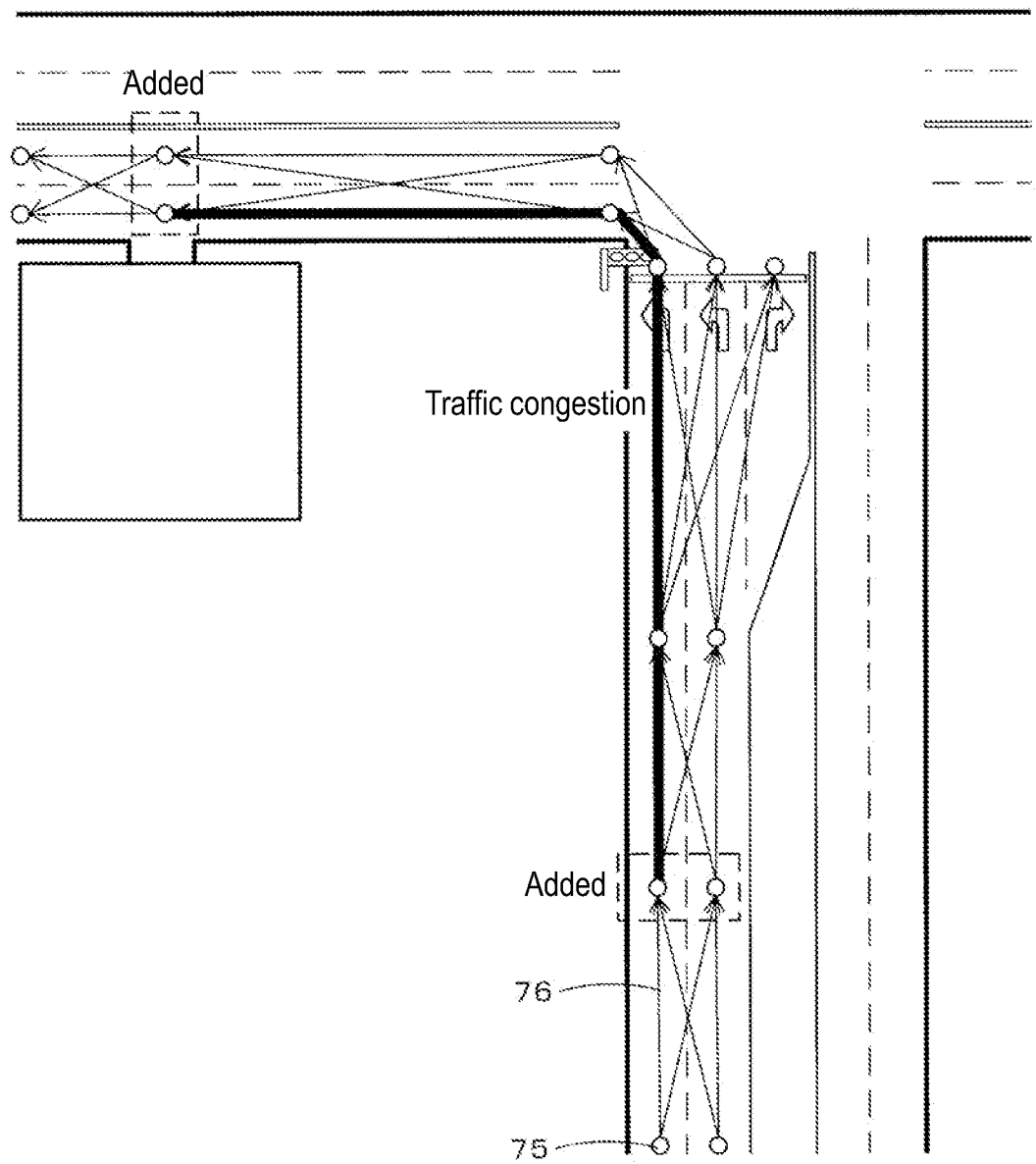
FIG. 11 is a diagram showing a lane network reconstructed based on traffic congestion information.

For example, as shown in FIG. 10, when traffic congestion has occurred in a section from a point X to a point Y in the far left lane out of a section for which a lane network is constructed, as shown in FIG. 11, a lane node 75 is newly set at each of locations corresponding to the point X and the point Y. In addition, lane nodes 75 are set not only in the far left lane having traffic congestion, but also in a right lane having no traffic congestion.

In addition, when there are a plurality of traffic congestion sections in a section for which a lane network is constructed, the setting of lane nodes at the above-described S26 is performed for each of the plurality of traffic congestion sections. Note that when there is no traffic congestion section in a section for which a lane network is constructed, subsequent processes from S26 to S28 are omitted and processing transitions to S29.

Thereafter, at S27, the CPU 51 reconstructs the lane network constructed at the above-described S23. Specifically, as shown in FIG. 11, lane links 76 are newly set so that the lane nodes 75 that are newly set at the above-described S26 are connected to existing lane nodes 75 adjacent thereto. As a result, a lane network including the newly set lane nodes 75 is constructed.

Figure 12:
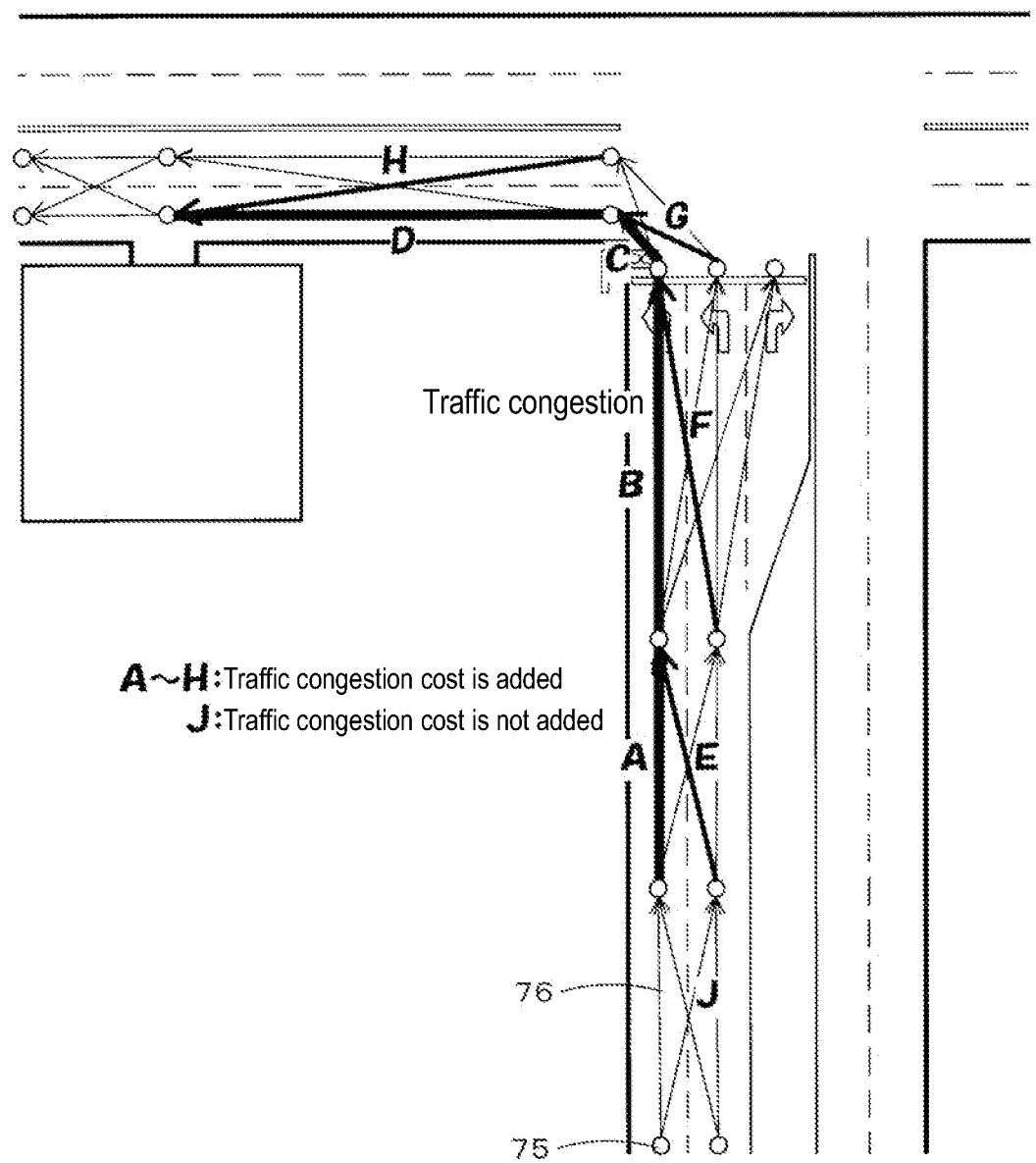
FIG. 12 is a diagram showing an example of adding a traffic congestion cost to a lane cost.

Then, at S28, the CPU 51 adds a traffic congestion cost to a lane cost of a lane link corresponding to the traffic congestion section among lane links included in the reconstructed lane network. Note that when a road includes a plurality of lanes, the addition is also performed on a lane link from which the vehicle moves into a lane having traffic congestion, in addition to a lane link corresponding to the lane having traffic congestion. For example, in an example shown in FIG. 12, addition of a traffic congestion cost to a lane cost is performed targeting four lane links 76 "A" to "D" corresponding to lanes having traffic congestion, and four lane links 76 "E" to "H" from which the vehicle moves into the lanes having traffic congestion. Note, however, that as shown in FIG. 12, even if a lane link is one from which the vehicle moves into a lane having traffic congestion, the lane link "J" that is connected from another lane to a node corresponding to a starting point of a traffic congestion section (the end of traffic congestion) is excluded from a target for addition of a traffic congestion cost. Namely, of lane nodes 75 included in a series of links of lane links 76 corresponding to the traffic congestion section, a lane link 76 that is connected from another lane to a lane node 75 corresponding to a point other than the starting point of the traffic congestion section is added with a higher cost than a lane link 76 that is connected from another lane to a lane node 75 corresponding to the starting point of the traffic congestion section.

In addition, for a method of adding a traffic congestion cost at the above-described S28, the addition may be performed by adding a predetermined value to the lane cost, or the addition may be performed by multiplying the lane cost by a predetermined coefficient. Particularly, in the present embodiment, the addition of a traffic congestion cost is performed by multiplication by a coefficient $\alpha$ which is calculated by the following equation (1):

$\alpha$=recommended speed for a road having traffic congestion (e.g., a speed limit or a legal speed limit for the road)/traffic congestion speed (e.g., it is assumed to be 5 km/h)　　(1)

In addition, a lane cost to which the above-described traffic congestion cost is to be added is provided for each lane link 76. The lane cost provided to each lane link 76 has, as a reference value, the length of the lane link 76 or the time required to move on the lane link 76. Particularly, in the present embodiment, the length of the lane link (in units of meters) is used as the reference value of the lane cost. Note, however, that for a lane link 76 (E to H of FIG. 12) that is connected from another lane to a lane node 75 corresponding to a point other than the starting point of the traffic congestion section, as a reference value for the lane link, the length from the starting point of the traffic congestion section (a point at which traffic congestion starts in a traveling direction) to a connecting point is used as a reference value of a lane cost. Furthermore, for a lane link involving a lane change, a lane change cost (e.g., 50) is added to the above-described reference value. Note that the value of the lane change cost may vary depending on the number of lane changes or a location where a lane change is made.

For example, when a lane change is made at a location near an intersection or when a lane change over two lanes is made, a lane change cost to be added can be set to a higher value.

Figure 13:
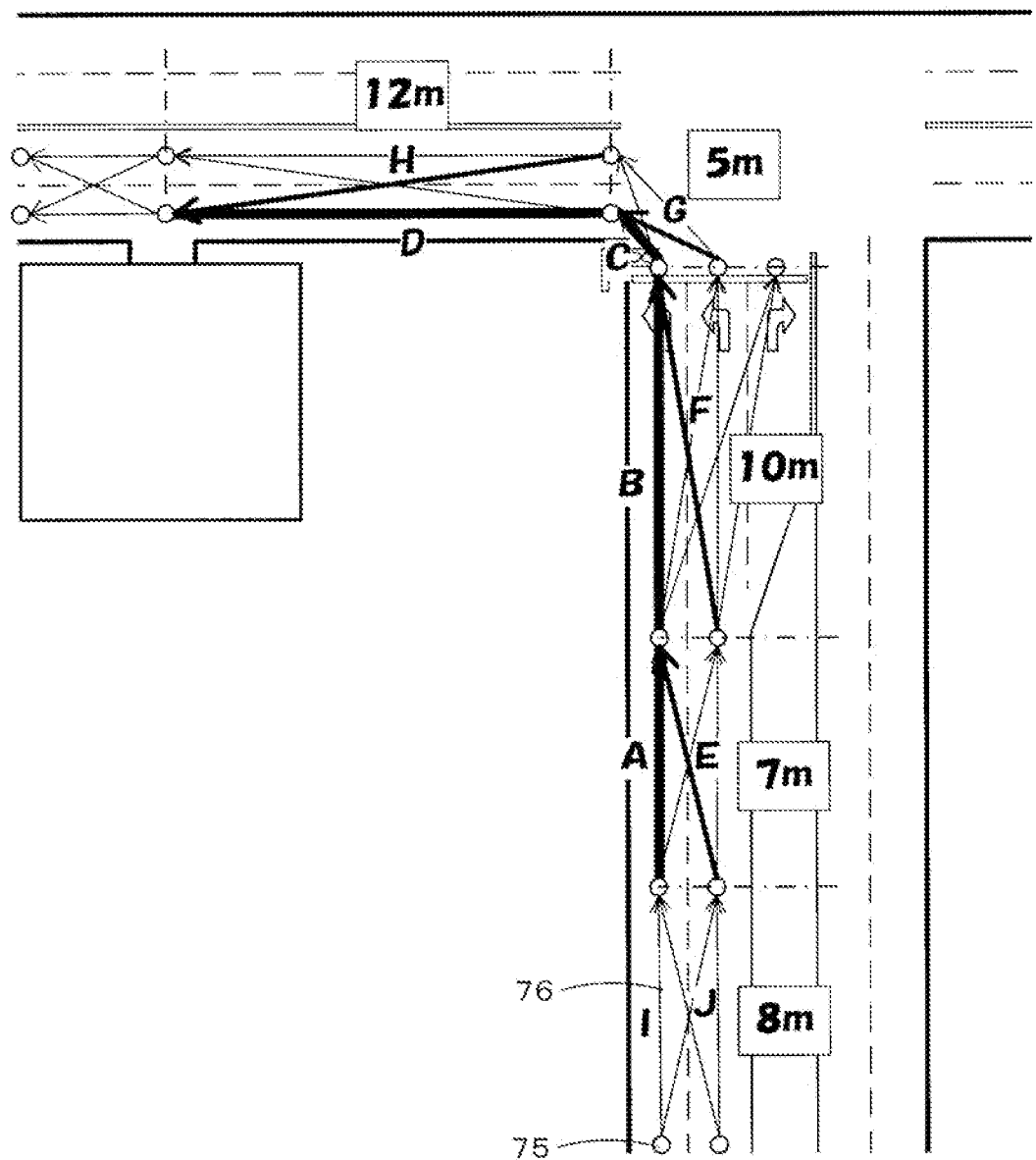
FIG. 13 is a diagram describing a method of searching for a recommended route using lane costs.

For example, when the lane links 76 "A" to "H" are assumed to have lengths as shown in FIG. 13 (if lane links are present in the same section, then the lane links are considered to have the same length regardless of whether there is a lane change), for each of the lane links 76 "A" to "H", a traffic congestion cost and a lane change cost are added as follows, by which a lane cost is calculated. Note that the coefficient $\alpha$ is "10" and the lane change cost is fixed at 50.

7 m×10=70　　(Lane link "A")

10 m×10=100　　(Lane link "B")

5 m×10=50　　(Lane link "C")

12 m×10=120　　(Lane link "D")

(7 m+50)×10=570　　(Lane link "E")

(10 m+7 m+50)×10=670　　(Lane link "F")

(5 m+10 m+7 m+50)×10=720　　(Lane link "G")

(12 m+5 m+10 m+7 m+50)×10=840　　(Lane link "H")

Note that for comparison, for the lane links 76 "I" and "J" that are not added with a traffic congestion cost, lane costs are calculated as follows:

8 m=8　　(Lane link "I")

8 m+50=58　　(Lane link "J")

Namely, in the present embodiment, a very high lane cost (e.g., about 10 times) is calculated for a lane link 76 corresponding to a traffic congestion section in a congested lane over a lane link 76 not corresponding to the traffic congestion section. In addition, a higher lane cost is calculated for a lane link 76 involving a lane change over a lane link 76 not involving a lane change, and for a lane link 76 where the vehicle moves into the traffic congestion section from another lane, particularly, a high cost is calculated except for a lane link 76 connected to a starting point of the traffic congestion section. Furthermore, a higher cost is calculated for lane links 76 (e.g., G and H) connected to the end point of the traffic congestion section over lane links 76 (e.g., E and F) connected to locations near the starting point of the traffic congestion section.

Thereafter, at S29, the CPU 51 derives a route with the lowest lane costs (hereinafter, referred to as recommended route) among routes each continuously connecting the start lane to the target lane, by referring to the lane network that is reconstructed at the above-described S27 and the lane costs that are finally calculated at the above-described S28. For example, a route is searched from a target-lane side using Dijkstra's algorithm. Note, however, that search means other than Dijkstra's algorithm may be used provided that a route that continuously connects the start lane to the target lane can be searched. The derived recommended route is a way of moving into lanes by the vehicle that is recommended when the vehicle moves, and also includes information that identifies a lane change location on a lane-link-by-lane-link basis.

Figure 14:
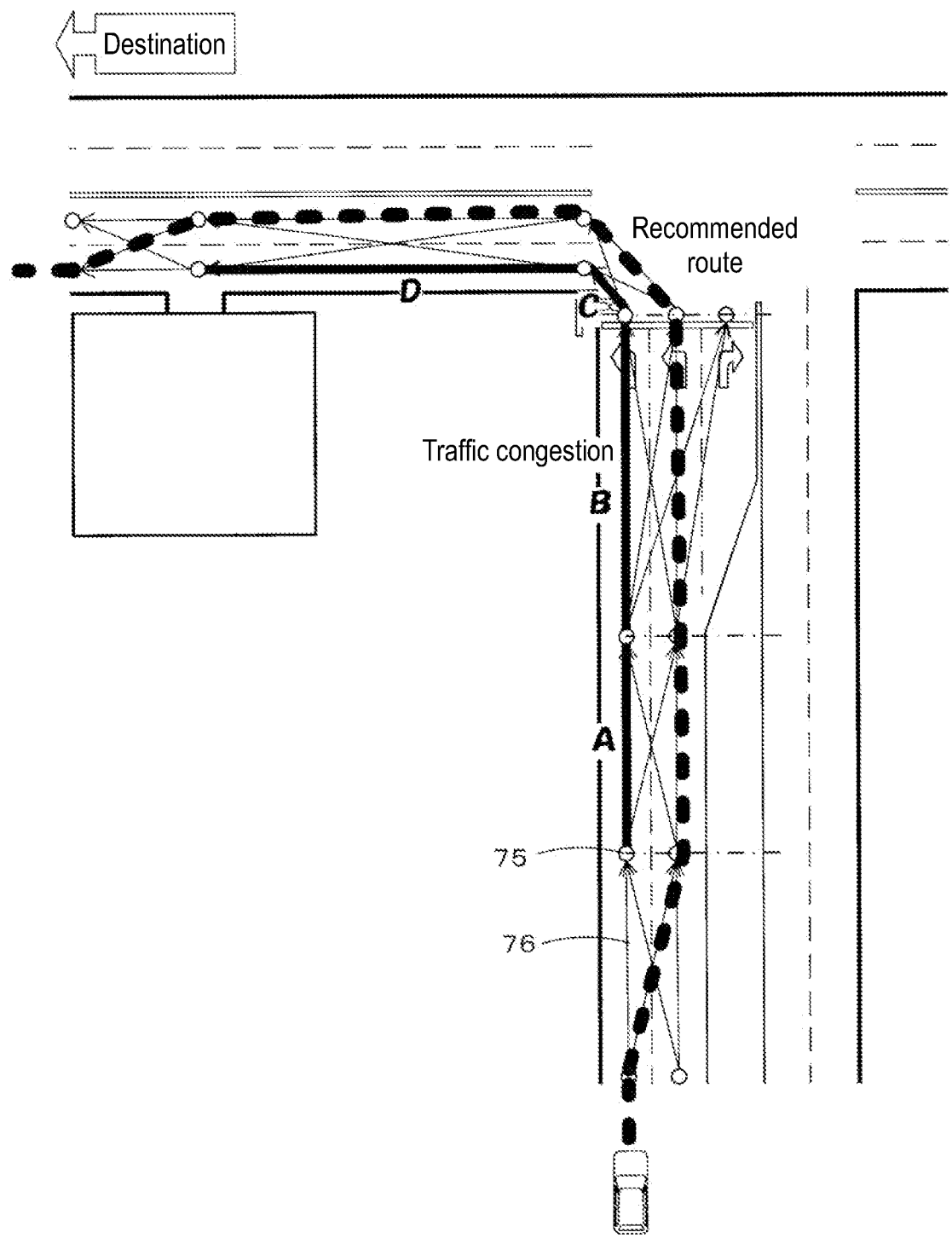
FIG. 14 is a diagram showing an example of a recommended route that avoids a traffic congestion section.

As described previously, for lane links 76 "A" to "D" corresponding to a traffic congestion section in a congested lane, a traffic congestion cost is added, by which a very high lane cost is calculated (e.g., about 10 times) over lane links 76 not corresponding to the traffic congestion section. In addition, the traffic congestion cost is high compared to a lane change cost that is added when a lane change is made. Thus, for example, when a target lane is set ahead of a traffic congestion section as shown in FIG. 14, a recommended route is searched on which the vehicle avoids lane links 76 "A" to "D" corresponding to the traffic congestion section, i.e., the vehicle makes a lane change before the traffic congestion section to move into a lane other than a left lane, and passes through the traffic congestion section, and then returns to an original lane.

Figure 15:
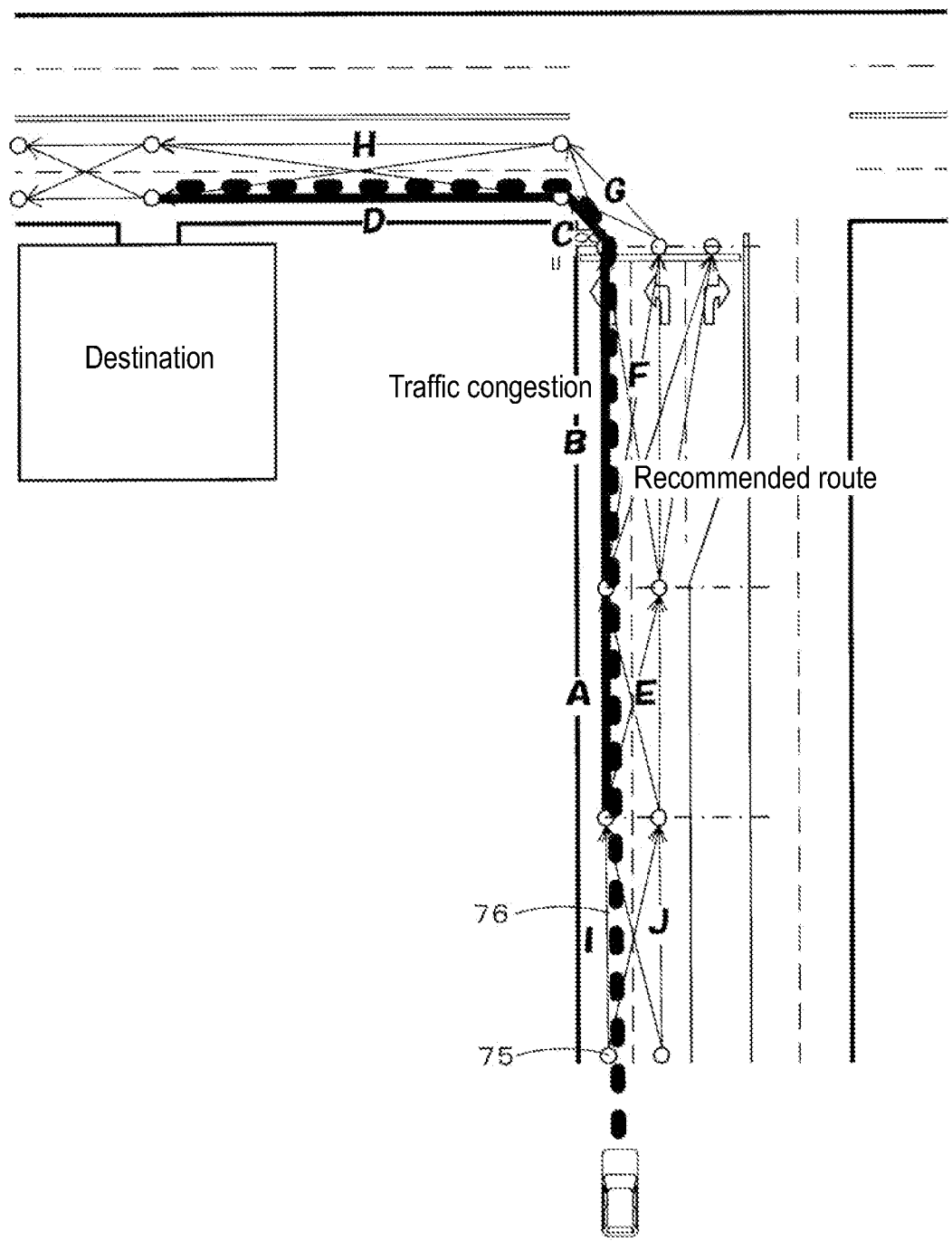
FIG. 15 is a diagram showing an example of a recommended route that passes through the traffic congestion section.

On the other hand, for example, when traffic congestion is formed by other vehicles that are waiting to enter a destination as shown in FIG. 15, i.e., when a target lane is set at an end point of a traffic congestion section, the vehicle needs to be finally guided to the traffic congestion section. In that case, for example, for a route that guides the vehicle to the traffic congestion section at the end point of the traffic congestion section (i.e., a route on which the vehicle makes a lane change before the traffic congestion section to travel in a right lane, and finally makes a lane change again in a lane link 76 "H", by which the vehicle is guided to the traffic congestion section), a total value of lane costs is calculated by the following equation (2):

$$8\text{ m}+50+7\text{ m}+10\text{ m}+5\text{ m}+(12\text{ m}+5\text{ m}+10\text{ m}+7\text{ m}+50)\times10=920 \quad (2)$$

In addition, for a route that guides the vehicle to the traffic congestion section in the middle of the traffic congestion section (i.e., a route on which the vehicle makes a lane change before the traffic congestion section to travel in the right lane, and makes a lane change again in the lane link 76 "F" in the middle, by which the vehicle is guided to the traffic congestion section), a total value of lane costs is calculated by the following equation (3):

$$8\text{ m}+50+7\text{ m}+(10\text{ m}+7\text{ m}+50)\times10+5\text{ m}\times10+12\text{ m}\times10=905 \quad (3)$$

In addition, for a route that guides the vehicle to the traffic congestion section at the starting point of the traffic congestion section (i.e., a route on which the vehicle continuously travels in the far left lane), a total value of lane costs is calculated by the following equation (4):

$$8\text{ m}+7\text{ m}\times10+10\text{ m}\times10+5\text{ m}\times10+12\text{ m}\times10=348 \quad (4)$$

As described above, for a case in which the vehicle needs to be finally guided to the traffic congestion section, the lane costs are lower for a route that guides the vehicle to the traffic congestion section in the lane link 76 "G" than a route that guides the vehicle to the traffic congestion section in the lane link 76 "H" after avoiding the traffic congestion section, and likewise, the lane costs are lower for a route that guides the vehicle to the traffic congestion section in the lane link 76 "F" than the route that guides the vehicle to the traffic congestion section in the lane link 76 "G", and likewise, the lane costs are lower for a route that guides the vehicle to the traffic congestion section in the lane link 76 "E" than the route that guides the vehicle to the traffic congestion section in the lane link 76 "F", and furthermore, the lane costs are lower for a route on which the vehicle travels in the traffic congestion section from the starting point of the traffic congestion section by passing through the lane link 76 "I" or "J" than the route that guides the vehicle to the traffic congestion section in the lane link 76 "E". Namely, for a route on which the vehicle enters the traffic congestion section in the middle of the traffic congestion section, the lane costs are lower for a route that guides the vehicle to the traffic congestion section at a location nearer to the starting point of the traffic congestion section, and the lane costs are even lower for a route on which the vehicle enters the traffic congestion section from the starting point of the traffic congestion section. Thus, a route on which the vehicle enters the traffic congestion section from the starting point of the traffic congestion section (in the example shown in FIG. 15, a route on which the vehicle travels in the traffic congestion section from the starting point of the traffic congestion section by passing through the lane link 76 "I" or "J") is searched as a recommended route. Note that although the example shown in FIG. 15 shows a case in which the target lane is set at the end point of the traffic congestion section, the same result is also obtained for a case in which the target lane is set in the middle of the traffic congestion section. Namely, in a case in which a static travel path to the destination is generated as shown in FIG. 15, when the end point of the traffic congestion section matches a point of entry into the destination or is present more to a traveling-direction side on the road than the point of entry into the destination and when a lane having traffic congestion is a recommended lane in which the vehicle needs to travel to enter the destination, a recommended route on which the vehicle moves into the recommended lane at the starting point of the traffic congestion section is likely to be searched.

In addition, in FIGS. 14 and 15, there is a congested lane near an intersection through which the vehicle is to pass next, and recommended routes are described that are searched when a destination is present ahead of the intersection having traffic congestion and when a destination is not present ahead of the intersection, but for a case in which there is a congested lane near the second or further next intersection, too, likewise, it is possible to search for a recommended route, taking into account traffic congestion conditions for each lane.

Figure 16:
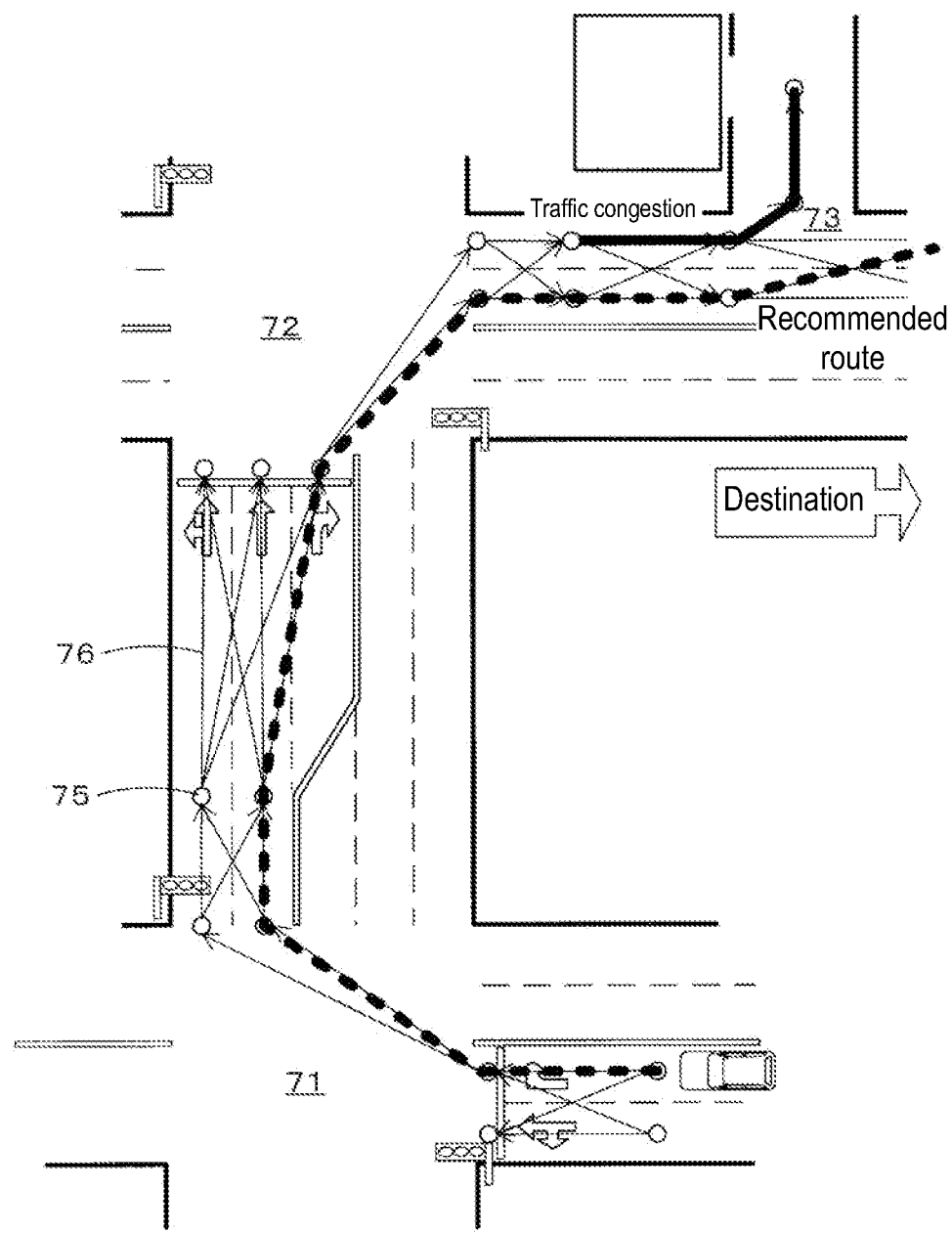
FIG. 16 is a diagram showing an example of a recommended route that avoids a traffic congestion section.

For example, an example shown in FIG. 16 shows a case in which there is traffic congestion in a left lane ahead of a second next intersection 72 from a vehicle. In the example shown in FIG. 16, since a destination is present straight ahead of an intersection 73, a target lane is not set in the middle or at an end point of a traffic congestion section, and thus, the congested left lane does not correspond to a recommended lane that is required for the vehicle to travel in to enter the destination. In that case, as described previously, for a lane link 76 corresponding to the traffic congestion section in the congested lane, a traffic congestion cost is added, by which a very high lane cost is calculated over a lane link 76 not corresponding to the traffic congestion section. Thus, as shown in FIG. 16, a recommended route is searched on a priority basis on which the vehicle enters a right lane upon turning right at the intersection 72, and moves to the left side after the traffic congestion section ends. As a result, a travel path that avoids the traffic congestion section can be generated, enabling the vehicle to reach the destination with the minimum time.

Figure 17:
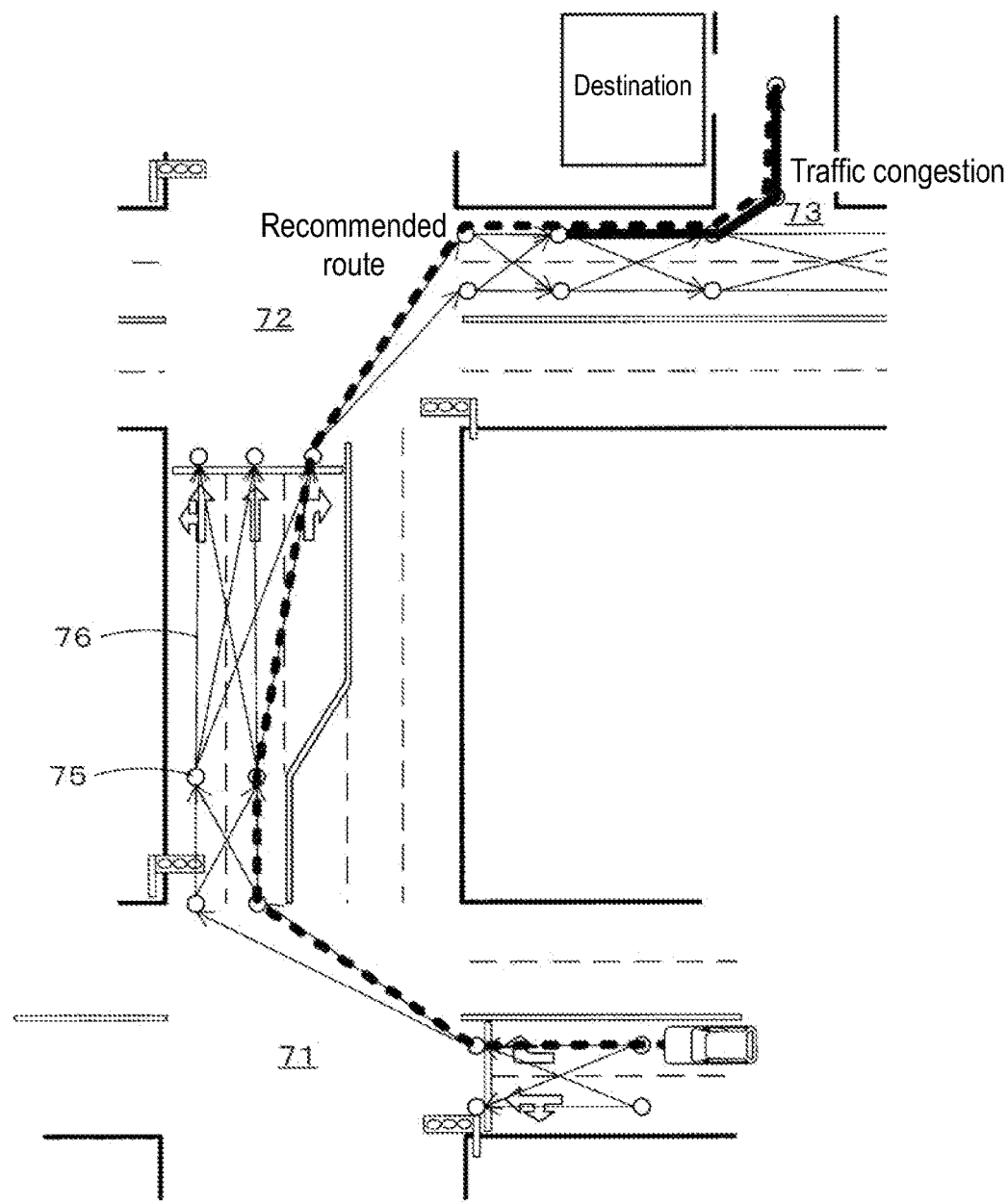
FIG. 17 is a diagram showing an example of a recommended route that passes through the traffic congestion section.

Likewise, an example shown in FIG. 17 shows a case in which there is traffic congestion in a left lane ahead of a second next intersection 72 from a vehicle. In the example shown in FIG. 17, a destination is located ahead after turning left at an intersection 73, and a target lane is set in the middle of or at an end point of a traffic congestion section, and thus, the congested left lane is a recommended lane that is required for the vehicle to travel in to enter the destination. In that case, as described previously, for a route on which the vehicle enters the traffic congestion section in the middle of the traffic congestion section, the lane costs are lower for a route that guides the vehicle to the traffic congestion section at a location nearer to a starting point of the traffic congestion section, and the lane costs are even lower for a route on which the vehicle enters the traffic congestion section from the starting point of the traffic congestion section. Thus, a recommended route is searched on a priority basis on which the vehicle enters the left lane upon turning right at the intersection 72 to move to the starting point of the traffic congestion section (the end of the traffic congestion). As a result, occurrence of an event in which the vehicle cannot turn left at the intersection 73 and thus needs to make a detour to the destination can be prevented.

Thereafter, at S30, the CPU 51 generates a specific travel path for traveling along the recommended route derived at the above-described S29. Note that for a travel path of a section involving lane changes, the locations of the lane changes are set such that the lane changes are not continuously made as much as possible and are made at locations away from an intersection. In addition, particularly, in a case of generating a travel path for making a left or right turn at an intersection or making a lane change, lateral acceleration (lateral G) occurring in the vehicle is calculated, and paths that are connected as smoothly as possible are calculated using clothoid curves on conditions that the lateral G does not interfere with autonomous driving assistance and does not exceed an upper limit value (e.g., 0.2 G) at which a passenger of the vehicle is not given discomfort. By performing the above-described process, a static travel path is generated which is a travel path recommended for the vehicle to travel along on roads included in the planned travel route. Note that for a block that is neither a block in which a lane change is made nor a block present at an intersection, a path that passes through the center of a lane is a travel path recommended for the vehicle to travel along.

The static travel path generated at the above-described S30 serves as a travel path where the vehicle travels in a recommended lane that is recommended for the vehicle to travel in, and when a lane change is involved, the static travel path also identifies a lane change location at which a lane change is made to the recommended lane. The static travel path is stored in the flash memory 54, etc., as assistance information used for autonomous driving assistance.

Figure 18:
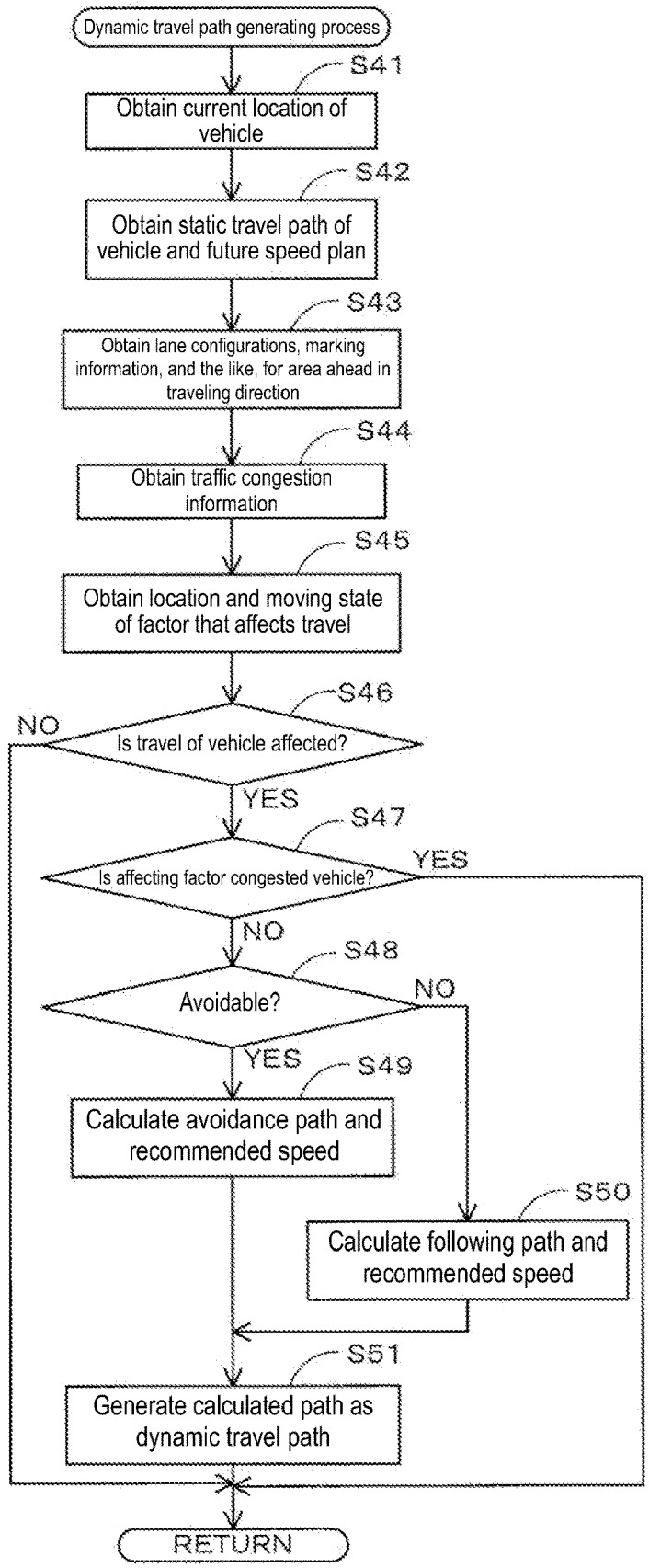
FIG. 18 is a flowchart of a subprocess program of a dynamic travel path generating process.

Next, a subprocess of the dynamic travel path generating process performed at the above-described S6 will be described based on FIG. 18. FIG. 18 is a flowchart of a subprocess program of the dynamic travel path generating process.

First, at S41, the CPU 51 obtains a current location of the vehicle detected by the current location detecting part 31. Note that it is desirable to specifically identify the current location of the vehicle using, for example, high-precision GPS information or a high-precision location technique. Here, the high-precision location technique is a technique in which a white line or road surface painting information captured with a camera installed on the vehicle is detected by image recognition, and furthermore, the detected white line or road surface painting information is checked against, for example, the high-precision map information 16, by which a driving lane or a high-precision vehicle location can be detected. Furthermore, when the vehicle travels on a road having a plurality of lanes, a lane in which the vehicle travels is also identified.

Then, at S42, the CPU 51 obtains the static travel path generated at the above-described S3 (i.e., a path where the vehicle is planned to travel in the future) and the speed plan created at the above-described S4 (i.e., planned speeds used by the vehicle in the future).

Then, at S43, the CPU 51 obtains, based on the high-precision map information 16 obtained at the above-described S2, lane configurations, marking information, etc., targeting an area ahead in a traveling direction of the vehicle, particularly, an area around the "factor that affects travel of the vehicle (hereinafter, referred to as affecting factor)" detected at the above-described S5. Note that the lane configurations and marking information obtained at the above-described S43 include information that identifies the number of lanes and how and where the number of lanes increases or decreases when there is an increase or decrease in the number of lanes, etc.

Subsequently, at S44, the CPU 51 obtains, from the server device 4, traffic congestion information indicating traffic congestion conditions for each lane, targeting an area ahead in the traveling direction of the vehicle. The traffic congestion information is information that identifies, on a lane-by-lane basis, a starting point and an end point (traffic congestion length may be used instead of the end point) of a section having traffic congestion. Note that as described previously, the server device 4 periodically collects, as probe information and from each vehicle, the coordinates of a current location of the vehicle, vehicle speed, and a captured image obtained by capturing an area around the vehicle with an in-vehicle camera provided in the vehicle, and performs statistics or analysis on each piece of the collected information, thereby generating traffic congestion information indicating traffic congestion conditions for each lane, and cumulatively stores the traffic congestion information in the traffic congestion information DB 14 (FIG. 3). The traffic congestion information obtained by the navigation device 1 at the above-described S44 is the most recently generated traffic congestion information indicating traffic congestion conditions of a road at the present time.

Subsequently, at S45, the CPU 51 obtains, for the affecting factor detected at the above-described S5, a location of the affecting factor at the present time and a moving state (a moving direction and a moving speed) when the affecting factor is moving. Note that the location and moving state of the affecting factor are obtained by performing, for example, image processing on a captured image obtained by capturing a predetermined detection range around the vehicle with the exterior camera 39.

In addition, for example, the real-time location, moving direction, moving speed, etc., of each vehicle traveling on a road across the country may be managed by an external server, and when another vehicle located around the vehicle is an affecting factor, the CPU 51 may obtain, at the above-described S44, the location, moving direction, and moving speed of corresponding another vehicle from the external server.

Thereafter, at S46, the CPU 51 first predicts a future moving trajectory of the affecting factor, based on the current location and moving state of the affecting factor obtained at the above-described S45. Note that when the affecting factor is another vehicle, the prediction may be made taking into account the turn-on/off states of turn signals and brake lights of another vehicle. Furthermore, if the future travel path and speed plan for another vehicle can be obtained by vehicle-to-vehicle communication, etc., then the prediction may be made taking into account the future travel path and speed plan. In addition, when the affecting factor is a congested vehicle, it is considered that the congested vehicle does not move from its location. Thereafter, based on the predicted future moving trajectory of the affecting factor and the static travel path and speed plan for the vehicle obtained at the above-described 542, it is more accurately determined whether the affecting factor affects travel of the vehicle. Specifically, when it is predicted that the vehicle and the affecting factor are located in the same lane at the present time or in the future and a distance therebetween reaches within an appropriate vehicle-to-vehicle distance D, it is determined that the affecting factor affects travel of the vehicle. Note that the appropriate vehicle-to-vehicle distance D is calculated by, for example, the following equation (5):

$$D = \text{vehicle speed of the vehicle} \times 2 \text{ seconds} + \text{vehicle's braking distance} - \text{affecting factor's braking distance} \quad (5)$$

(note, however, it is exclusive to a case in which the affecting factor is a moving object)

If it is determined that the affecting factor affects travel of the vehicle (S46: YES), then processing transitions to S47. On the other hand, if it is determined that the affecting factor does not affect travel of the vehicle (S46: NO), then processing transitions to S9 (S7 and S8 are omitted) without generating a dynamic travel path.

At S47, the CPU 51 compares the traffic congestion information obtained at the above-described S44 with the location of another vehicle detected as the affecting factor by the vehicle, thereby determining whether the affecting factor that is determined at the above-described S46 to affect travel of the vehicle is a congested vehicle. Note that a case in which a congested vehicle is detected as the affecting factor that is determined to affect travel of the vehicle corresponds, for example, to a case in which there is a traffic congestion section ahead in a traveling direction of the vehicle and a vehicle at the end of the traffic congestion is detected by the exterior camera 39, etc.

If it is determined that the affecting factor that is determined to affect travel of the vehicle is a congested vehicle (547: YES), then processing transitions to S9 (S7 and S8 are omitted) without generating a dynamic travel path. Here, as described previously, in a case of generating a static travel path, when there is a traffic congestion section and a target lane is set, particularly, at an end point or in the middle of the traffic congestion section, as shown in FIG. 15, a static travel path is set where the vehicle intentionally passes through the traffic congestion section from the starting point of the traffic congestion section without avoiding the traffic congestion section. Thus, even if an affecting factor that affects travel of the vehicle is detected by the exterior camera 39, etc., if the affecting factor is a congested vehicle, then a current static travel path is maintained without newly generating a path for avoiding the affecting factor.

On the other hand, if it is determined that the affecting factor that is determined to affect travel of the vehicle is not a congested vehicle (S47: NO), then processing transitions to S48.

At S48, the CPU 51 determines whether a new path for the vehicle to avoid the affecting factor and return to the static travel path (i.e., pass the affecting factor) can be generated. Specifically, when the affecting factor and the vehicle are located in the same lane at the present time, for a path where the vehicle makes a lane change to the right to pass the affecting factor in a range in which vehicle speed does not exceed a speed limit, and then makes a lane change to the left to return to an original lane, if a path where the vehicle maintains an appropriate vehicle-to-vehicle distance D or more between the vehicle and the affecting factor can be formed, then it is determined that a new path for the vehicle to avoid the affecting factor and return to the static travel path can be generated. In addition, when the affecting factor and the vehicle are located in different lanes at the present time and the vehicle later moves into the same lane as the affecting factor, for a path where the vehicle passes the affecting factor in a range in which vehicle speed does not exceed a speed limit, and then makes a lane change to the same lane as the affecting factor, if a path where the vehicle maintains an appropriate vehicle-to-vehicle distance D or more between the vehicle and the affecting factor can be formed, then it is determined that a new path for the vehicle to avoid the affecting factor and return to the static travel path can be generated. In the determination process at the above-described S48, the determination is made based on the lane configurations and marking information for an area ahead in the traveling direction of the vehicle which are obtained at the above-described S43, the current location of the vehicle, the future moving trajectory of the affecting factor, and the speed limit for a road.

If it is determined that a new path for the vehicle to avoid the affecting factor and return to the static travel path (i.e., pass the affecting factor) can be generated (S48: YES), then processing transitions to S49. On the other hand, if it is determined that a new path for the vehicle to avoid the affecting factor and return to the static travel path (i.e., pass the affecting factor) cannot be generated (S48: NO), then processing transitions to S50.

At S49, the CPU 51 calculates a path for the vehicle to avoid the affecting factor and return to the static travel path (i.e., pass the affecting factor) (hereinafter, referred to as avoidance path). For example, when the vehicle and the affecting factor are located in the same lane at the present time, as shown in FIG. 19, a path where the vehicle makes a lane change to the right to pass the affecting factor and then makes a lane change to the left to return to an original lane corresponds to an avoidance path.

Figure 19:
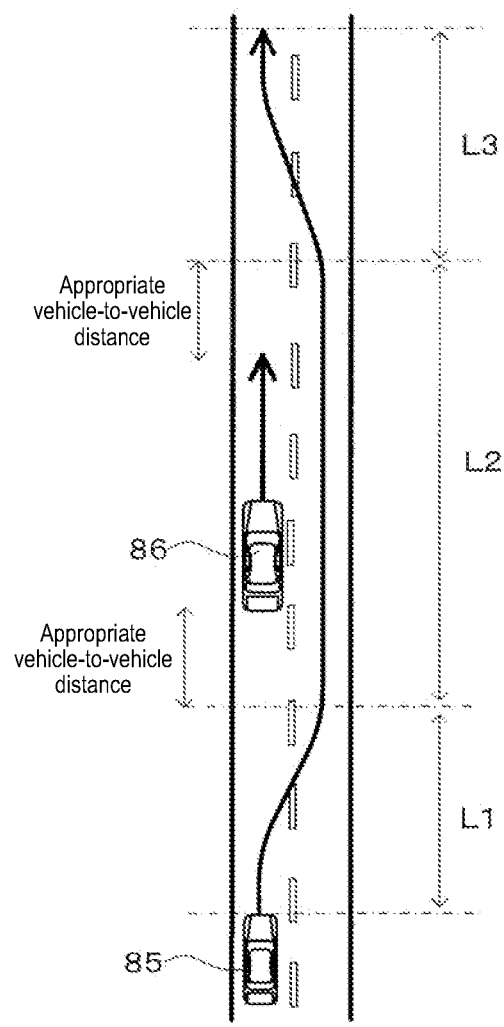
FIG. 19 is a diagram showing an example of an avoidance path which is one of dynamic travel paths.

Here, FIG. 19 shows an example of an avoidance path generated at the above-described S49 when a vehicle 85 travels in a left lane on a road with two lanes in each direction and an affecting factor is a lead vehicle 86 that travels in the same lane as the vehicle 85.

First, in the example shown in FIG. 19, a first path L1 is calculated that is required for the vehicle to move into a right lane by starting a turn of the steering and for the steering position to return to a straight-ahead direction. Note that for the first path L1, a path that is as smooth as possible and has the shortest possible distance required for a lane change is calculated using a clothoid curve on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance D or more between the vehicle and the lead vehicle 86 is another condition.

Then, a second path L2 is calculated where the vehicle travels in the right lane with a speed limit being an upper limit, to pass the lead vehicle 86 and travels until an appropriate vehicle-to-vehicle distance D or more between the vehicle and the lead vehicle 86 is obtained. Note that the second path L2 is basically a straight path, and the length of the path is calculated based on the vehicle speed of the lead vehicle 86 and the speed limit for the road.

Subsequently, a third path L3 is calculated that is required for the vehicle to return to the left lane by starting a turn of the steering and for the steering position to return to the straight-ahead direction. Note that for the third path L3, a path that is as smooth as possible and has the shortest possible distance required for a lane change is calculated using a clothoid curve on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance D or more between the vehicle and the lead vehicle 86 is another condition.

In addition, at the above-described S49, a recommended speed for the vehicle at which the vehicle travels along the above-described avoidance path is also calculated. For the recommended speed for the vehicle, with a speed limit being an upper limit, a speed at which lateral acceleration (lateral G) occurring in the vehicle upon making a lane change does not interfere with autonomous driving assistance and does not exceed an upper limit value (e.g., 0.2 G) at which a passenger of the vehicle is not given discomfort is set as the recommended speed. For example, the calculation is performed based on the curvature of the avoidance path, the speed limit, etc.

Figure 20:
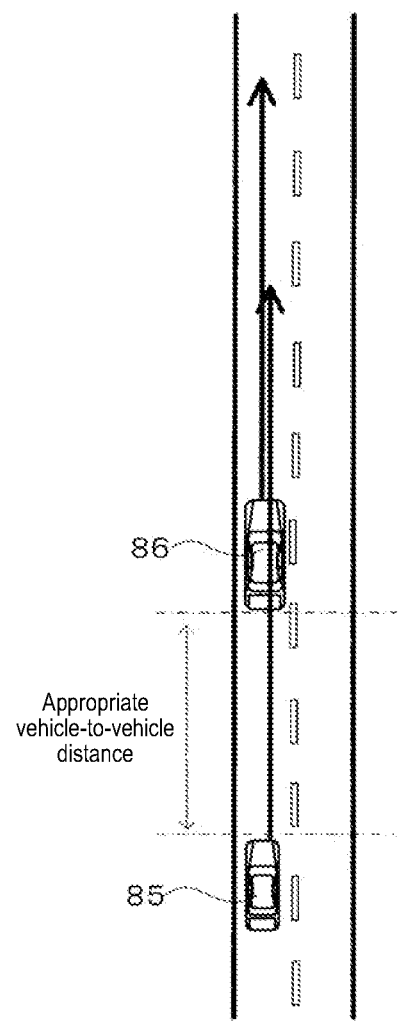
FIG. 20 is a diagram showing an example of a following path which is one of dynamic travel paths.

On the other hand, at S50, the CPU 51 calculates a path for the vehicle to travel following (or side by side with) the affecting factor (hereinafter, referred to as following path). Specifically, when the vehicle and the affecting factor are located in the same lane at the present time, as shown in FIG. 20, a path where the vehicle 85 continues to travel in the current lane without making a lane change to follow the affecting factor (e.g., the lead vehicle 86) corresponds to a following path. Note that the following path is basically the same path as the static travel path. Note, however, that since the vehicle-to-vehicle distance between the vehicle and the affecting factor needs to be appropriately maintained, as will be described later, the speed plan is modified (S8).

In addition, at the above-described S50, a recommended speed for the vehicle at which the vehicle travels along the above-described following path is also calculated. For the following speed for the vehicle, with a speed limit being an upper limit, a speed at which an appropriate vehicle-to-vehicle distance D or more is maintained between the vehicle and the affecting factor ahead of the vehicle is set as the recommended speed. Note that the appropriate vehicle-to-vehicle distance D is calculated based on the above-described equation (5).

Thereafter, at S51, the CPU 51 generates the avoidance path calculated at the above-described S49 (only when the avoidance path is calculated) and the following path calculated at the above-described S50, as a dynamic travel path, taking into account road conditions around the vehicle, the dynamic travel path being a travel path recommended for the vehicle to travel along on a road included in the planned travel route.

The dynamic travel path generated at the above-described S51 is stored in the flash memory 54, etc., as assistance information used for autonomous driving assistance.

Figure 21:
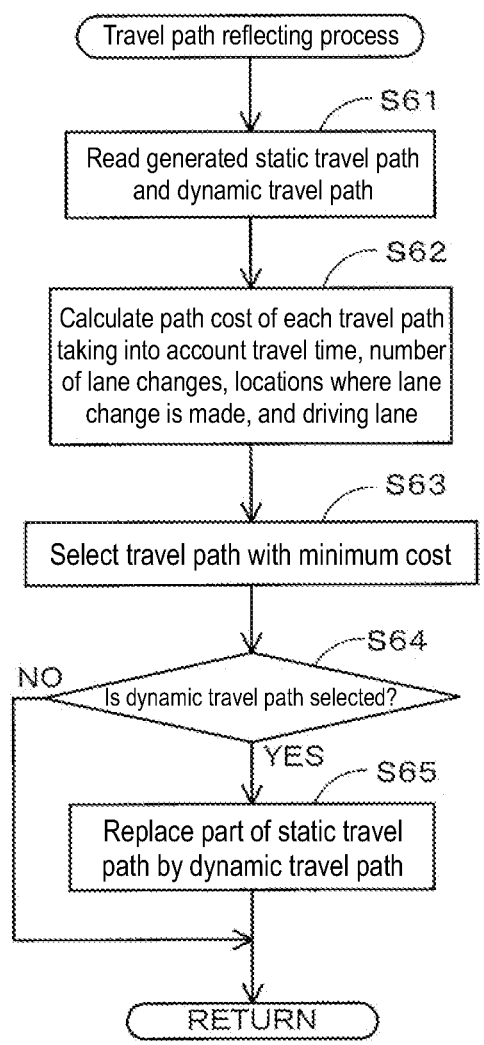
FIG. 21 is a flowchart of a subprocess program of a travel path reflecting process.
Figure 22:
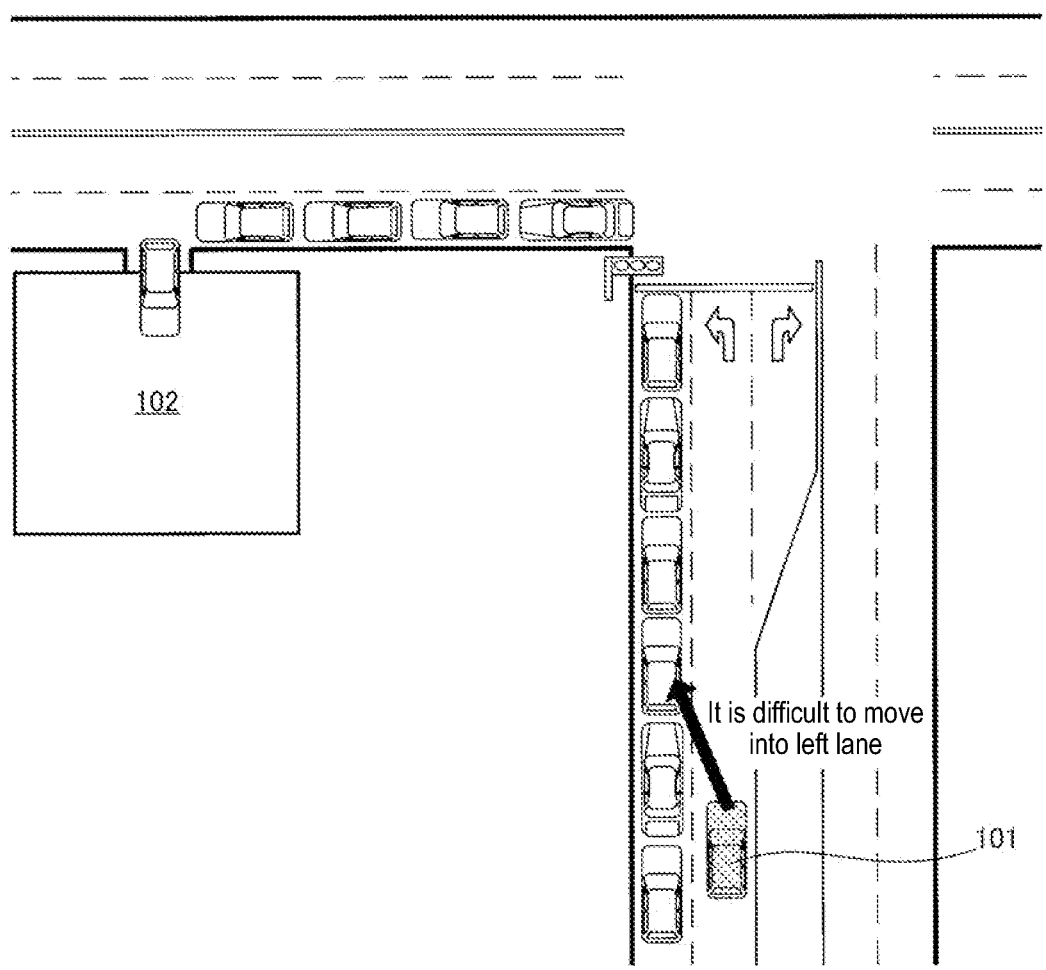
FIG. 22 is a diagram describing a problem of a conventional technique.

Next, a subprocess of the travel path reflecting process performed at the above-described S7 will be described based on FIG. 21. FIG. 21 is a flowchart of a subprocess program of the travel path reflecting process.

First, at S61, the CPU 51 reads the static travel path generated at the above-described S3 and the dynamic travel path generated at the above-described S6 from a storage medium such as the flash memory 54.

Subsequently, at S62, for each travel path read at the above-described S61, the CPU 51 calculates, for each travel path, a path cost indicating the level of appropriateness as a travel path of the vehicle. Here, the path cost is calculated taking into account at least one or more of (a) travel time (average vehicle speed), (b) the number of lane changes, (c) locations where a lane change is made, and (d) a driving lane. Specifically, the calculation is performed based on the following conditions.

For (a) "travel time (average vehicle speed)", a higher path cost is calculated for a travel path with longer travel time (i.e., a lower average vehicle speed). Note that an average vehicle speed for the static travel path is identified based on the speed plan created at the above-described S4. On the other hand, for the dynamic travel path, an average vehicle speed is identified based on the recommended speed calculated at the above-described S49 or S50.

For (b) "the number of lane changes", a higher path cost is calculated for a travel path with a larger number of lane changes.

For (c) "locations where a lane change is made", when a plurality of lane changes are made, a higher path cost is calculated for a travel path with a shorter interval between lane changes. In addition, for a travel path where a lane change is made within an area before and at a predetermined distance from an intersection (e.g., 700 m for general roads and 2 km for expressways), a path cost is added.

For (d) "a driving lane", a higher path cost is calculated for a travel path with a longer travel distance of a passing lane.

Note, however, that regardless of the above-described conditions (a) to (d), for a travel path that is determined to cause the vehicle to collide with the affecting factor detected at the above-described S5, the cost is infinity.

Thereafter, at S63, the CPU 51 compares the path costs for the respective travel paths which are calculated at the above-described S62, and selects one of the static travel path and the dynamic travel path that has a smaller value of the path cost, as a travel path recommended for the vehicle to travel along.

Then, at S64, the CPU 51 determines whether the dynamic travel path has been selected at the above-described S63.

If it is determined at the above-described S63 that the dynamic travel path has been selected (S64: YES), then processing transitions to S65.

At S65, the CPU 51 replaces the static travel path by the dynamic travel path, targeting a reconstructed section in which the selected dynamic travel path is generated. Note that when the static travel path in the reconstructed section is replaced by the dynamic travel path, basically, the starting point and end point of the dynamic travel path are connected to the static travel path, but depending on a route selected at the above-described S49 or 550, the end point of the dynamic travel path may not be connected to the static travel path. In such a case, a static travel path may be newly generated with the end point of the dynamic travel path being a starting point of the static travel path, or a dynamic travel path may be repeatedly generated at regular intervals until the dynamic travel path is connected to the static travel path.

Thereafter, assistance travel by autonomous driving assistance is performed based on the static travel path whose reconstructed section is replaced by the dynamic travel path (S9 and S10).

On the other hand, if it is determined at the above-described S63 that the static travel path has been selected (S64: NO), then processing transitions to S8 without replacement by the dynamic travel path.

Here, when the static travel path is selected as a travel path with a small value of the path cost, the path is one where the vehicle continues to travel in the current lane without making a lane change, to follow the affecting factor. Thus, replacement by the dynamic travel path is not performed, but in the following path, the vehicle-to-vehicle distance between the vehicle and the affecting factor needs to be appropriately maintained, and thus, the speed plan is modified (S8).

As described in detail above, the navigation device 1 and a computer program executed by the navigation device 1 according to the present embodiment obtain a planned travel route on which the vehicle travels (S1), obtain, from an external source, traffic congestion conditions for each lane on the planned travel route (S25), generate a travel path that identifies a lane change location at which a lane change is made to a recommended lane, targeting a section from a current location of the vehicle to a location a predetermined distance ahead of the vehicle and using map information including at least information about markings and the traffic congestion conditions for each lane, the recommended lane being recommended for the vehicle to travel in on a road included in the planned travel route (S29 and S30), and provide driving assistance for the vehicle, based on the generated travel path (S9 and S10), and thus, when driving assistance for the vehicle is provided, it becomes possible to generate a travel path of the vehicle that identifies a lane change location at which a lane change is made to a recommended lane that is recommended for traveling, taking into account traffic congestion conditions for each lane obtained from an external source. As a result, for example, without generating an undesirable travel path where the vehicle cuts in a congested lane from another lane in the middle of a congested section, it becomes possible to generate a more appropriate travel path of the vehicle compared to conventional ones. Then, by providing driving assistance based on the generated travel path, the driving assistance can be appropriately provided.

In addition, road conditions in a predetermined detection range around the vehicle are obtained (S5) and a static travel path which is a travel path is generated targeting a section from a current location of the vehicle to a location a predetermined distance ahead of the vehicle, the section including an area outside the detection range (S3), a dynamic travel path which is a travel path recommended for the vehicle to travel along on a road included in the planned travel route is generated separately from the static travel path, targeting only an area within the detection range and using the map information, the traffic congestion conditions for each lane, and the road conditions around the vehicle obtained by the vehicle (S6), and driving assistance for the vehicle is provided based on at least one of the static travel path and the dynamic travel path (S9 and S10), and thus, it becomes possible to create an appropriate travel plan that uses materials that can be obtained on a per distance-from-the vehicle basis. Particularly, by generating travel paths targeting a narrow region and a wider region whose road conditions around the vehicle can be obtained, it becomes possible to select an appropriate travel path based on conditions of the vehicle.

In addition, a lane network representing, by nodes and links each connecting nodes, movement into lanes that can be selected by the vehicle on the planned travel route is obtained (S23), the lane network is reconstructed by adding nodes to locations corresponding to a starting point and an end point of a traffic congestion section in the lane network, based on the traffic congestion conditions for each lane (S26 and S27), a higher cost is added to a link corresponding to a lane having traffic congestion and corresponding to a traffic congestion section than other links, and then a route from a departure node to a target node is searched using costs added to the reconstructed lane network, and a travel path is generated using the searched route (S29 and S30), and thus, it becomes possible to generate an appropriate travel path for avoiding or passing through the traffic congestion section, using the lane network including nodes and links.

In addition, of nodes included in a link or a series of links corresponding to a lane having traffic congestion and corresponding to a traffic congestion section, a higher cost is added to a link that is connected from another lane to a node corresponding to a point other than a starting point of a traffic congestion section than a link that is connected from another lane to a node corresponding to the starting point of the traffic congestion section (S28), and thus, an undesirable travel path where the vehicle cuts in a congested lane from another lane in the middle of a congested section can be prevented from being generated.

In addition, in a case in which a traffic congestion section is present in a section from a current location of the vehicle to a location a predetermined distance ahead of the vehicle, when an end point of the traffic congestion section matches a point of entry into a destination or is present more to a traveling-direction side on a road than the point of entry into the destination and when a lane having traffic congestion is a recommended lane in which the vehicle needs to travel to enter the destination, a lane change location at which the vehicle moves into the recommended lane is identified at a starting point of the traffic congestion section, and thus, when the vehicle needs to travel in a congested lane, it becomes possible to generate a travel path that guides the vehicle to the end of the traffic congestion.

Note that the present disclosure is not limited to the above-described embodiment, and it is, of course, possible to make various modifications and alterations thereto without departing from the spirit and scope of the present disclosure.

For example, in the present embodiment, traffic congestion information that identifies traffic congestion conditions for each lane (FIG. 3) is generated by the server device 4 based on probe information collected from vehicles, but instead of the server device 4 generating the traffic congestion information, for example, the traffic congestion information may be obtained as VICS information from an external source. In addition, the traffic congestion information may be statistical information generated based on the past traffic congestion information (i.e., information that identifies predicted traffic congestion conditions), instead of information that identifies real-time traffic congestion conditions.

In addition, in the present embodiment, a static travel path that is finally generated is information that identifies a specific path (a set of coordinates and lines) where the vehicle travels, but such a level of information that does not identify a specific path but can identify roads and lanes where the vehicle is to travel may be obtained.

In addition, in the present embodiment, when it is determined that the affecting factor that is determined to affect travel of the vehicle is a congested vehicle (S47: YES), a current static travel path is maintained without generating a dynamic travel path, but a dynamic travel path may be generated. With a dynamic travel path being generated, a comparison may be made between the lane costs of the static travel path and the dynamic travel path, and a travel path with a lower cost may be selected.

In addition, in the present embodiment, for a lane link 76 that is connected from another lane to a lane node 75 corresponding to a point other than a starting point of a traffic congestion section (E to H of FIG. 12), as a reference value for the lane link, the length from the starting point of the traffic congestion section (a point at which traffic congestion starts in a traveling direction) to a connecting point is used as a reference value of a lane cost, but a sufficiently large fixed value may be used. Even in that case, it becomes possible to prevent generation of a travel path where the vehicle cuts in in the middle of the traffic congestion section.

In addition, in the present embodiment, a lane network is generated using the high-precision map information 16 (S23), but a lane network that targets roads across the country may be stored in advance in a DB, and the lane network may be read from the DB as necessary.

In addition, in the present embodiment, high-precision map information included in the server device 4 includes both information about the lane configurations of roads (lane-by-lane road configurations, curvatures, lane widths, etc.) and information about markings (centerlines, lane lines, edge lines, guidelines, etc.) painted on the roads, but may include only the information about markings or may include only the information about the lane configurations of roads. For example, even if only the information about markings is included, it is possible to estimate information corresponding to the information about the lane configurations of roads, based on the information about markings. In addition, even if only the information about the lane configurations of roads is included, it is possible to estimate information corresponding to the information about markings, based on the information about the lane configurations of roads. In addition, the "information about markings" may be information that identifies the types or layout of markings themselves that mark off lanes, or may be information that identifies whether a lane change can be made between adjacent lanes, or may be information that directly or indirectly identifies the configurations of lanes.

In addition, in the present embodiment, when an affecting factor that affects travel of the vehicle has been detected, a dynamic travel path is generated and a comparison is made between the path costs of an existing static travel path and the newly generated dynamic travel path (S62 and S63), and only when it is determined that the dynamic travel path is recommended, the static travel path is replaced by the dynamic travel path (S65), but when a dynamic travel path is generated, a static travel path may always be replaced by the dynamic travel path.

In addition, in the present embodiment, as means for reflecting a dynamic travel path in a static travel path, a part of the static travel path is replaced by the dynamic travel path (S9), but instead of replacement, the static travel path may be modified to approximate to the dynamic travel path.

In addition, the present embodiment describes that autonomous driving assistance for performing autonomous travel independently of user's driving operations refers to control, by the vehicle control ECU 40, of all of an accelerator operation, a brake operation, and a steering wheel operation which are operations related to the behavior of the vehicle among vehicle operations. However, the autonomous driving assistance may refer to control, by the vehicle control ECU 40, of at least one of an accelerator operation, a brake operation, and a steering wheel operation which are operations related to the behavior of the vehicle among vehicle operations. On the other hand, it is described that manual driving by user's driving operations refers to performing, by the user, of all of an accelerator operation, a brake operation, and a steering wheel operation which are operations related to the behavior of the vehicle among vehicle operations.

In addition, driving assistance of the present disclosure is not limited to autonomous driving assistance related to autonomous driving of the vehicle. For example, it is also possible to provide driving assistance by displaying the static travel path identified at the above-described S5 or the dynamic travel path generated at the above-described S8 on a navigation screen and providing guidance using voice, a screen, etc. (e.g., guidance on a lane change or guidance on a recommended vehicle speed). In addition, user's driving operations may be assisted by displaying a static travel path or a dynamic travel path on a navigation screen.

In addition, in the present embodiment, a configuration is adopted in which the autonomous driving assistance program (FIG. 4) is executed by the navigation device 1, but a configuration may be adopted in which the autonomous driving assistance program is executed by an in-vehicle device other than the navigation device 1 or by the vehicle control ECU 40. In that case, a configuration is adopted in which the in-vehicle device or the vehicle control ECU 40 obtains a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, aspects of the present disclosure can also be applied to mobile phones, smartphones, tablet terminals, personal computers, etc. (hereinafter, referred to as portable terminals, etc.) in addition to navigation devices. In addition, aspects of the disclosure can also be applied to a system including a server and a portable terminal, etc. In that case, a configuration may be adopted in which each step of the above-described autonomous driving assistance program (see FIG. 4) is performed by either one of the server and the portable terminal, etc. Note, however, that when aspects of the present disclosure is applied to a portable terminal, etc., a vehicle that can provide autonomous driving assistance and the portable terminal, etc. need to be connected to each other such that they can communicate with each other (it does not matter whether they are connected by wire or wirelessly).

REFERENCE SIGNS LIST

1: Navigation device, 2: Driving assistance system, 3: Information delivery center, 4: Server device, 5: Vehicle, 14: Traffic congestion information DB, 16: High-precision map information, 33: Navigation ECU, 40: Vehicle control ECU, 51: CPU, 75: Lane node, and 76: Lane link

The invention claimed is:

1. A driving assistance device comprising:
planned travel route obtaining means for obtaining a planned travel route on which a vehicle travels;
traffic congestion conditions obtaining means for obtaining, from an external source, traffic congestion conditions for each lane on the planned travel route;
travel path generating means for generating a travel path, targeting a section from a current location of a vehicle to a location a predetermined distance ahead of the vehicle and using map information including at least information about markings and the traffic congestion conditions for each lane, the travel path identifying a lane change location at which a lane change is made to a recommended lane, and the recommended lane being recommended for the vehicle to travel in on a road included in the planned travel route;
a camera or sensor mounted on the vehicle to obtain road conditions in a predetermined direction range around the vehicle, wherein
the travel path generating means
generates a static travel path, targeting a section from a current location of the vehicle to a location a predetermined distance ahead of the vehicle, the static travel path being the travel path and the section including an area outside the detection range, and
generates a dynamic travel path separately from the static travel path, targeting only an area within the predetermined detection range and using the map information, the traffic congestion conditions for each lane, and road conditions around the vehicle obtained by a vehicle, the dynamic travel path being a travel path recommended for the vehicle to travel along on a road included in the planned travel route; and autonomous driving assistance means for providing driving assistance travel control for a vehicle, based on at least one of the static travel path and the dynamic travel path.

2. The driving assistance device according to claim 1, comprising:
lane network obtaining means for obtaining a lane network representing, by nodes and links each connecting nodes, movement into lanes that can be selected by a vehicle on the planned travel route; and
network reconstructing means for reconstructing the lane network by adding nodes to locations corresponding to a starting point and an end point of a traffic congestion section in the lane network, based on the traffic congestion conditions for each lane,
wherein
the travel path generating means
adds a higher cost to a link corresponding to a lane having traffic congestion and corresponding to a traffic congestion section than to other links, and then searches for a route from a departure node to a target node, using costs added to the reconstructed lane network, and
generates the travel path using a searched route.

3. The driving assistance device according to claim 2, wherein the travel path generating means adds a higher cost to a link that is connected from another lane to a node corresponding to a point other than a starting point of a traffic congestion section than to a link that is connected from another lane to a node corresponding to a starting point of a traffic congestion section among nodes included in a link or a series of links corresponding to a lane having traffic congestion and corresponding to a traffic congestion section.

4. The driving assistance device according to claim 1, wherein in a case in which a traffic congestion section is present in a section from a current location of a vehicle to a location a predetermined distance ahead of a vehicle, when an end point of a traffic congestion section matches a point of entry into a destination or is present more to a traveling-direction side on a road than a point of entry into a destination and when a lane having traffic congestion is the recommended lane in which the vehicle needs to travel to enter the destination, the travel path generating means identifies, at a starting point of a traffic congestion section, a lane change location at which the vehicle moves into the recommended lane.

* * * * *